(12) United States Patent
Hayashi

(10) Patent No.: US 11,285,614 B2
(45) Date of Patent: Mar. 29, 2022

(54) AUTONOMOUSLY ACTING ROBOT THAT UNDERSTANDS PHYSICAL CONTACT

(71) Applicant: GROOVE X, Inc., Tokyo (JP)

(72) Inventor: Kaname Hayashi, Tokyo (JP)

(73) Assignee: GROOVE X, INC., Tokyo (JP)

( * ) Notice: Subject to any disclaimer, the term of this patent is extended or adjusted under 35 U.S.C. 154(b) by 602 days.

(21) Appl. No.: 16/245,261

(22) Filed: Jan. 11, 2019

(65) Prior Publication Data
US 2019/0143528 A1    May 16, 2019

Related U.S. Application Data

(63) Continuation of application No. PCT/JP2017/025859, filed on Jul. 18, 2017.

(30) Foreign Application Priority Data

Jul. 20, 2016   (JP) .............................. JP2016-142060

(51) Int. Cl.
| | |
|---|---|
| *G06F 17/00* | (2019.01) |
| *B25J 11/00* | (2006.01) |
| *B25J 5/00* | (2006.01) |
| *A63H 3/36* | (2006.01) |
| *A63H 11/00* | (2006.01) |
| *B25J 13/00* | (2006.01) |
| *A63H 3/40* | (2006.01) |
| *B25J 19/02* | (2006.01) |

(52) U.S. Cl.
CPC ............ *B25J 11/0015* (2013.01); *A63H 3/36* (2013.01); *A63H 3/40* (2013.01); *A63H 11/00* (2013.01); *B25J 5/00* (2013.01); *B25J 11/001* (2013.01); *B25J 13/00* (2013.01); *B25J 19/02* (2013.01)

(58) Field of Classification Search
CPC ...... B25J 11/0015; B25J 13/00; B25J 11/001; B25J 19/02; B25J 5/00; A63H 11/00; A63H 3/40; A63H 3/36
USPC ......................................................... 700/245
See application file for complete search history.

(56) References Cited

U.S. PATENT DOCUMENTS

| | | |
|---|---|---|
| 6,505,098 B1 | 1/2003 | Sakamoto et al. |
| 6,565,371 B1 | 5/2003 | Watanabe |
| | (Continued) | |

FOREIGN PATENT DOCUMENTS

| | | |
|---|---|---|
| CN | 1287522 A | 3/2001 |
| EP | 1941411 B1 | 9/2011 |
| | (Continued) | |

OTHER PUBLICATIONS

Office Action in DE Application No. 112017003651.8, dated Jun. 3, 2020. 16pp.

(Continued)

*Primary Examiner* — Ronnie M Mancho
(74) *Attorney, Agent, or Firm* — Hauptman Ham, LLP

(57) ABSTRACT

A planar touch sensor (an electrostatic capacitance sensor) for detecting a contact by a user on a body surface is installed on a robot. Pleasantness and unpleasantness are determined in accordance with a place of contact and a strength of contact on the touch sensor. Behavioral characteristics of the robot change in accordance with a determination result. Familiarity with respect to the user who touches changes in accordance with the pleasantness or unpleasantness. The robot has a curved form and has a soft body.

20 Claims, 12 Drawing Sheets

(56) References Cited

U.S. PATENT DOCUMENTS

| | | | | |
|---|---|---|---|---|
| 7,744,442 B2* | 6/2010 | Rettberg | ............... | A63H 3/365 446/301 |
| 7,988,522 B2* | 8/2011 | Chen | ............... | A63H 3/40 446/376 |
| 8,046,620 B2* | 10/2011 | Fong | ............... | G04G 21/04 713/400 |
| 8,483,873 B2* | 7/2013 | Wong | ............... | G06N 3/008 700/245 |
| 8,506,343 B2* | 8/2013 | Goff | ............... | A63H 3/28 446/175 |
| 8,545,283 B2* | 10/2013 | Richter | ............... | A63H 3/28 446/297 |
| 8,583,956 B2* | 11/2013 | Fong | ............... | G04G 7/00 713/400 |
| 8,662,954 B2* | 3/2014 | Goff | ............... | A63H 3/28 446/175 |
| 8,684,786 B2* | 4/2014 | Chan | ............... | A63H 3/28 446/330 |
| 8,795,022 B2* | 8/2014 | Lipman | ............... | A63H 3/28 446/175 |
| 8,845,384 B2* | 9/2014 | Ghaly | ............... | A63H 3/52 446/297 |
| 8,926,393 B2* | 1/2015 | Morley | ............... | A63H 3/02 446/175 |
| 8,939,840 B2* | 1/2015 | Heatherly | ............... | A63F 13/65 463/42 |
| 9,079,113 B2* | 7/2015 | Wong | ............... | A63H 3/001 |
| 9,092,021 B2* | 7/2015 | Wong | ............... | G05B 19/04 |
| 9,421,475 B2* | 8/2016 | Garbos | ............... | A63H 33/38 |
| 9,616,353 B2* | 4/2017 | Chan | ............... | A63H 3/28 |
| 9,796,095 B1* | 10/2017 | Hanson | ............... | B25J 11/001 |
| 9,934,817 B2* | 4/2018 | O'Shields | ............... | G11B 27/00 |
| 10,067,557 B2* | 9/2018 | Schlumberger | ...... | A63F 13/211 |
| 10,350,505 B2* | 7/2019 | Chan | ............... | A63H 3/006 |
| 10,360,859 B1* | 7/2019 | Heilbron | ............... | G09G 3/342 |
| 10,452,816 B2* | 10/2019 | Kidd | ............... | G16H 40/63 |
| 10,653,969 B1* | 5/2020 | Mccart-Pollak | ...... | A63H 3/003 |
| 2004/0225410 A1 | 11/2004 | Aoyama et al. | | |
| 2005/0091684 A1 | 4/2005 | Kawabata et al. | | |
| 2005/0171640 A1 | 8/2005 | Sabe et al. | | |
| 2006/0041332 A1 | 2/2006 | Sabe et al. | | |
| 2007/0128979 A1* | 6/2007 | Shackelford | ........... | A63H 3/001 446/484 |
| 2007/0192910 A1 | 8/2007 | Vu et al. | | |
| 2008/0147239 A1 | 6/2008 | Chiang et al. | | |
| 2008/0201014 A1 | 8/2008 | Sonoura | | |
| 2013/0123987 A1 | 5/2013 | Kase et al. | | |
| 2014/0092323 A1* | 4/2014 | Hwang | ............... | G06F 3/041 349/12 |
| 2015/0088310 A1 | 3/2015 | Pinter et al. | | |
| 2015/0205298 A1 | 7/2015 | Stoschek et al. | | |
| 2015/0314454 A1* | 11/2015 | Breazeal | ............... | B25J 9/0003 700/259 |
| 2016/0193732 A1* | 7/2016 | Breazeal | ............... | B25J 9/1694 700/258 |
| 2016/0198995 A1* | 7/2016 | Yeung | ............... | A61B 5/6826 600/595 |
| 2016/0365198 A1* | 12/2016 | Pan | ............... | G01L 1/02 |
| 2017/0031491 A1* | 2/2017 | Bao | ............... | G06F 3/04144 |
| 2017/0249037 A1* | 8/2017 | Sato | ............... | G06F 3/03547 |
| 2018/0081439 A1* | 3/2018 | Daniels | ............... | G06F 3/015 |
| 2019/0054626 A1* | 2/2019 | Ide | ............... | B25J 19/023 |

FOREIGN PATENT DOCUMENTS

| | | |
|---|---|---|
| JP | 2000-323219 A | 11/2000 |
| JP | 2001-157977 A | 6/2001 |
| JP | 2001-162058 A | 6/2001 |
| JP | 2003-251580 A | 9/2003 |
| JP | 2004-249393 A | 9/2004 |
| JP | 2006-281349 A | 10/2006 |
| JP | 2008149442 A | 7/2008 |
| JP | 2013-13946 A | 1/2013 |

OTHER PUBLICATIONS

Office Action in CN Application No. 201780044645.7, dated Jun. 11, 2020. 23pp.

Examination report in GB Application No. 1902083.3, dated Apr. 20, 2021. 4pp.

Written Opinion of the ISA in PCT/JP2017/025859, dated Oct. 10, 2017, 19pp.

Office Action in JP Application No. 2017-566426, dated Apr. 3, 2018. 7pp.

Office Action in JP Application No. 2017-566426, dated Jul. 31, 2018. 7pp.

International Search Report in PCT/JP2017/025859, dated Oct. 10, 2017. 8pp.

* cited by examiner

AUTONOMOUSLY ACTING ROBOT THAT UNDERSTANDS PHYSICAL CONTACT

RELATED APPLICATIONS

The present application is a continuation of International Application No. PCT/JP2017/025859, filed Jul. 18, 2017, which claims priority from Japanese Application No. 2016-142060, filed Jul. 20, 2016, the disclosures of which applications are hereby incorporated by reference herein in their entirety.

TECHNICAL FIELD

The present invention relates to a robot that autonomously selects an action in accordance with an internal state or an external environment.

BACKGROUND ART

A human acquires various items of information from an external environment via sensory organs, and selects an action. There are times when an action is consciously selected, and times when an action is subconsciously selected. A repeated action becomes a subconscious action in time, and a new action remains in a consciousness region.

A human believes that he or she has a will to freely select his or her own action, that is, that he or she has a free will. A reason that a human harbors an emotion such as affection or enmity toward another person is that he or she believes that the other person also has a free will. A person that has a free will, or at least an existence that can be supposed to have a free will, is also an existence that eases a person's loneliness.

A reason that a human keeps a pet, more than whether or not the pet is useful to the human, is that the pet provides solace. It is precisely because a pet is an existence that to a greater or lesser degree creates an impression of having a free will that the pet can be a good companion to a human. Meanwhile, for various reasons such as not being able to secure sufficient time to look after a pet, not having a living environment in which a pet can be kept, having an allergy, or hating the thought of being parted by death, there are many people who give up on keeping a pet. If there were a robot that performed the role of a pet, it may be that people who cannot keep a pet would also be provided with the kind of solace that a pet provides refer to JP-A-2000-323219).

SUMMARY OF INVENTION

Technical Problem

Although robot technology has advanced swiftly in recent years, the technology has not advanced so far as to realize a presence as a pet-like companion. This is because it cannot be thought that a robot has a free will. A human, by observing an action such that it can only be thought that a pet has a free will, feels the existence of a free will in the pet, empathizes with the pet, and is given solace by the pet.

Consequently, it is thought that if there were a robot that has human-like or animal-like behavioral characteristics, in other words, a robot that can autonomously select a human-like or animal-like action, empathy toward the robot could be greatly increased.

The invention, having been completed based on the heretofore described idea, has a main object of providing technology for causing behavioral characteristics of a robot to change by coming into contact with a person.

Solution to Problem

An autonomously acting robot in an aspect of the invention includes a sensor that detects a contact by a user on a body surface of the robot, a recognizing unit that determines an affection expression level in accordance with a contact place and a contact strength, and an operation control unit that causes behavioral characteristics of the robot to change in accordance with the affection expression level.

An autonomously acting robot in another aspect of the invention includes a sensor that detects a contact by a user, an operation control unit that selects a motion of the robot in accordance with the contact, a drive mechanism that executes the motion selected by the operation control unit, and an outer skin formed of an elastic body.

The sensor is formed as a curved sensor that covers the outer skin.

An autonomously acting robot in another aspect of the invention includes a planar sensor installed on a body surface of the robot and detecting a contact on the robot, an operation control unit that controls an operation of the robot in accordance with the contact on the robot, and a drive mechanism that executes an operation specified by the operation control unit.

The robot has a curved body surface. The sensor is installed along the curve of the body surface of the robot.

An autonomously acting robot in another aspect of the invention includes a recognizing unit that recognizes a lifting and hugging of the robot, an operation control unit that selects a motion of the robot, and a drive mechanism that executes the motion selected by the operation control unit.

The recognizing unit categorizes aspects of lifting and hugging into multiple kinds. The operation control unit selects a motion in accordance with the kind of lifting and hugging from among a multiple of motions responding to the lifting and hugging.

Advantageous Effects of Invention

According to the invention, empathy toward a robot is easily increased.

DESCRIPTION OF EMBODIMENTS

In general, a person expresses an emotion toward a companion by communication via physical contact. A person subconsciously carries out an action of bringing bodies or portions of skin into contact by hugging a companion, rubbing cheeks, stroking a head, or the like, in accordance with his or her own emotion. The same applies when the companion is a robot, and it is supposed that the more a user feels empathy toward the robot, and sees the robot as a living creature rather than as a mere machine, the more noticeable a desire for physical contact becomes. A robot in this embodiment recognizes physical contact from a user, understands an emotion of the user toward the robot from the physical contact, and changes a behavioral aspect.

Figure 1A:
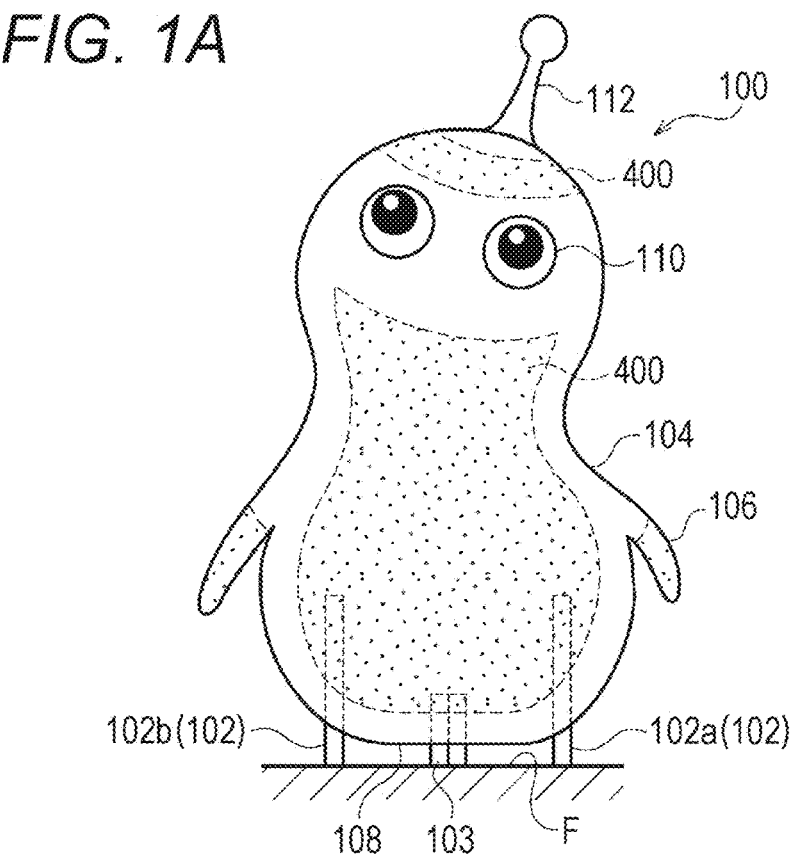
FIG. 1A is a front external view of a robot.
Figure 1B:
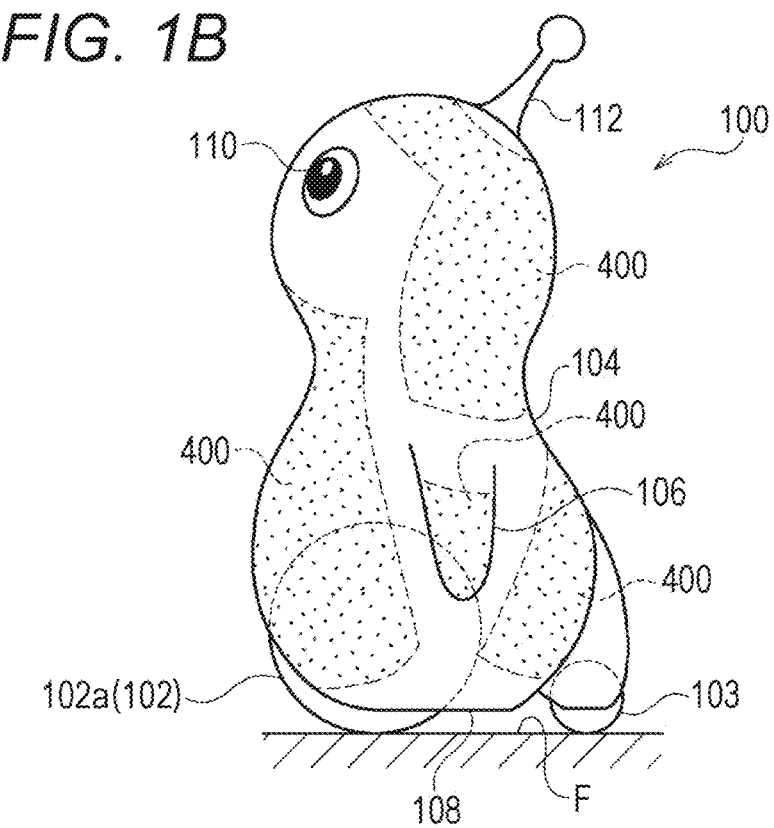
FIG. 1B is a side external view of a robot.

FIG. 1A is a front external view of a robot 100. FIG. 1B is a side external view of the robot 100.

The robot 100 in this embodiment is an autonomously acting robot that determines an action or gesture based on an external environment and an internal state. The external environment is recognized using various kinds of sensor, such as a camera or a thermosensor. The internal state is quantified as various parameters that express emotions of the robot 100. These will be described hereafter.

With indoor action as a precondition, the robot 100 has, for example, an interior of an owner's home as an action range. Hereafter, a human involved with the robot 100 will be called a "user", and a user forming a member of a home to which the robot 100 belongs will be called an "owner".

A body 104 of the robot 100 has a rounded form all over, and includes an outer skin formed of a soft material having elasticity, such as urethane, rubber, a resin, or a fiber. The robot 100 may be clothed. By the body 104, which is rounded, soft, and pleasant to touch, being adopted, the robot 100 provides a user with a sense of security and a pleasant tactile sensation.

A total weight of the robot 100 is 15 kilograms or less, preferably 10 kilograms or less, and more preferably still 5 kilograms or less. A majority of babies start to walk by themselves by 13 months after birth. An average weight of a baby 13 months after birth is a little over 9 kilograms for boys, and a little under 9 kilograms for girls. Because of this, when the total weight of the robot 100 is 10 kilograms or less, a user can hold the robot 100 with an effort practically equivalent to that of holding a baby that cannot walk by itself. An average weight of a baby less than 2 months after birth is less than 5 kilograms for both boys and girls. Consequently, when the total weight of the robot 100 is 5 kilograms or less, a user can hold the robot 100 with an effort practically equivalent to that of holding a very young baby.

Advantages of a user holding the robot 100 easily, and wanting to hold the robot 100, are realized by the attributes of appropriate weight and roundness, softness, and pleasantness of touch. For the same reasons, a height of the robot 100 is desirably 1.2 meters or less, or preferably 0.7 meters or less. Being able to be held is an important concept of the robot 100 in this embodiment.

The robot 100 includes three wheels for three-wheeled traveling. As shown in the drawings, the robot 100 includes a pair of front wheels 102 (a left wheel 102a and a right wheel 102b) and one rear wheel 103. The front wheels 102 are drive wheels, and the rear wheel 103 is a driven wheel.

Although the front wheels 102 have no steering mechanism, rotational speed and a direction of rotation can be individually controlled. The rear wheel 103 is formed of a so-called omni wheel, and rotates freely in order to cause the robot 100 to move forward and back, and left and right. By controlling so that the rotational speed of the right wheel 102b is greater than that of the left wheel 102a, the robot 100 can turn left or rotate counterclockwise. By controlling so that the rotational speed of the left wheel 102a is greater than that of the right wheel 102b, the robot 100 can turn right or rotate clockwise.

The front wheels 102 and the rear wheel 103 can be completely stored in the body 104 using a drive mechanism (a pivoting mechanism and a linking mechanism). A greater portion of each wheel is hidden by the body 104 when traveling too, but when each wheel is completely stored in the body 104, the robot 100 is in a state of being unable to move. That is, the body 104 descends, and sits on a floor surface F, in accompaniment to an operation of the wheels being housed. In the sitting state, a flat seating face 108 (a ground bottom face) formed in a bottom portion of the body 104 comes into contact with the floor surface F.

The robot 100 has two arms 106. The arms 106 do not have a function of gripping an object. The arms 106 can perform simple actions such as raising, waving, and oscillating. The two arms 106 can also be controlled individually.

A camera is incorporated in an eye 110. The eye 110 is also capable of an image display using a liquid crystal element or an organic EL element. In addition to the camera incorporated in the eye 110, various sensors, such as a highly directional microphone and an ultrasonic sensor, are mounted in the robot 100. Also, a speaker is incorporated, and the robot 100 is also capable of simple speech.

A horn 112 is attached to a head portion of the robot 100. As the robot 100 is lightweight, as heretofore described, a user can also lift up the robot 100 by grasping the horn 112.

A multiple of touch sensors 400 are installed along a curved body surface on the body 104 of the robot 100. The touch sensor 400 in this embodiment is a projection type electrostatic capacitance sensor. The touch sensor 400 is such that a multiple of electrode wires are installed in a matrix form on a bendable plastic film. When a user comes into contact with the planar touch sensor 400, electrostatic capacitance in a periphery of the place of contact changes. The place of contact (coordinates) is identified by electrode wires intersecting each other in the touch sensor 400 detecting the change in electrostatic capacitance. A multiple touch can also be detected in the case of the projection type electrostatic capacitance method. Even when the touch sensor 400 and a finger do not come into direct contact, a touch through a glove, for example, can also be detected.

As shown in FIG. 1, the touch sensor 400 is installed over a whole of the body surface of the robot 100. The touch sensor 400 is installed on at least main portions such as the head portion, an abdomen portion, a chest portion, a buttock portion, a lower back portion, the bottom portion, an upper back portion, and the arm 106 of the robot 100. "Main portion" in this embodiment refers to at least both the head portion and the abdomen portion (or the chest portion). Preferably, the upper back portion is also included. It is desirable that a touch on the upper back can also be detected in addition to a touch on the head portion and the abdomen portion (or the chest portion). Providing the touch sensor 400 on the bottom portion is useful for detecting a holding on a knee. Provided that contact with a main portion can be detected, the touch sensor 400 may be small in size.

Of course, the touch sensor 400 desirably covers the whole of the body surface of the robot 100. The touch sensor 400 desirably covers at least 30% or more, preferably 50% or more, of the body surface.

The rounded, soft body 104 provides a user with a pleasant tactile sensation from the robot 100. Also, as the robot 100 incorporates heat generating parts such as a battery 118 and a control circuit 342 (to be described hereafter), one portion of heat in the interior is transmitted to the body surface. Warmth of the body 104 of the robot 100 also increases the pleasant sensation accompanying contact with the robot 100.

Figure 2:
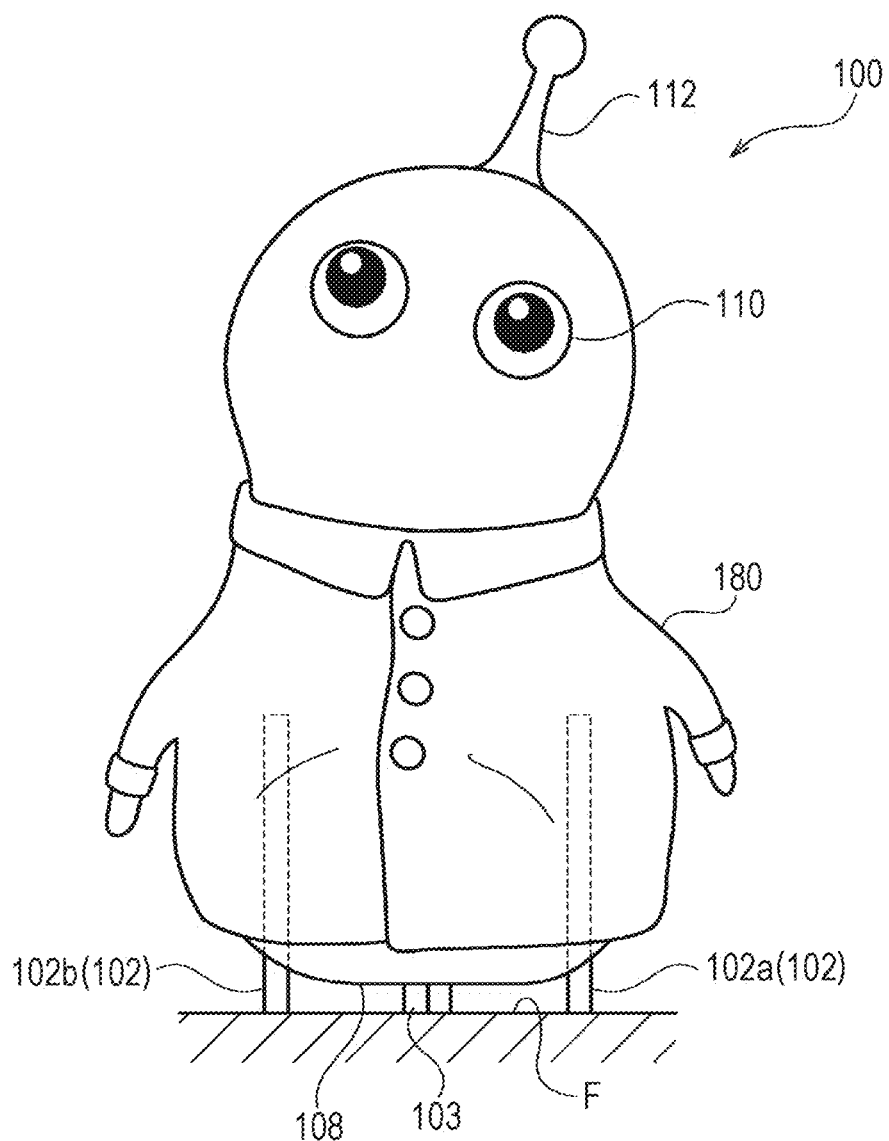
FIG. 2 is a front external view of the robot when wearing clothing.

FIG. 2 is a front external view of the robot 100 when wearing clothes.

A user can put clothing 180 on the robot 100. There are various kinds of the clothing 180. An RFID (radio frequency identifier) tag is sewn into the clothing 180. The RFID tag emits "clothing ID" that identifies clothing at close range. By reading the clothing ID from the RFID tag, the robot 100 can recognize that the robot 100 is wearing the clothing 180, and recognize the category of the clothing 180 that the robot 100 is wearing. The robot 100 may wear multiple items of the clothing 180 in layers.

Figure 3:
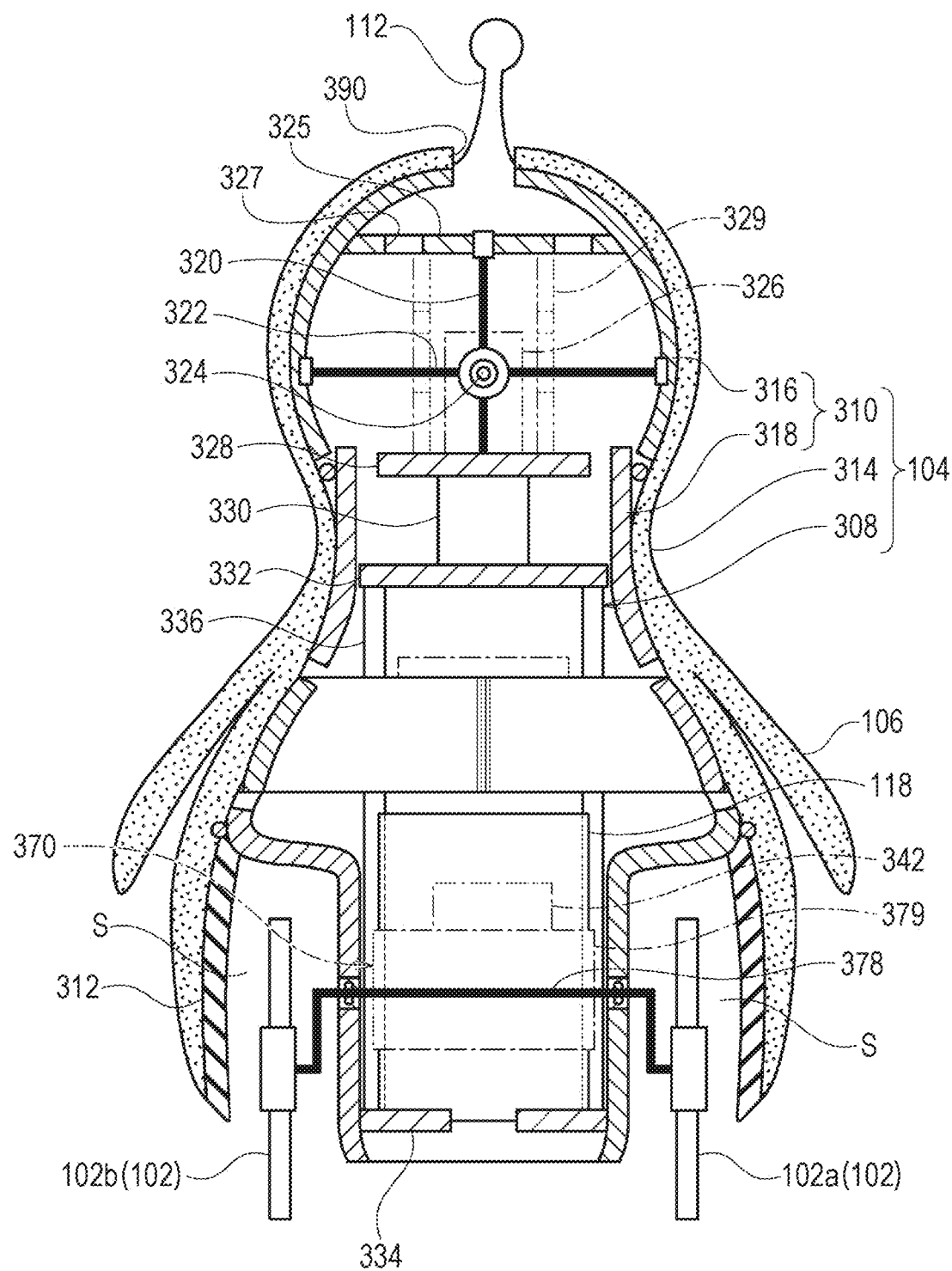
FIG. 3 is a sectional view schematically representing a structure of the robot.

FIG. 3 is a sectional view schematically representing a structure of the robot 100.

As shown in FIG. 3, the body 104 of the robot 100 includes a base frame 308, a main body frame 310, a pair of wheel covers 312 made of resin, and an outer skin 314. The base frame 308 is formed of metal, and supports an internal mechanism together with configuring a shaft of the body 104. The base frame 308 is configured by an upper plate 332 and a lower plate 334 being linked vertically by a multiple of side plates 336. A sufficient interval is provided between the multiple of side plates 336 so that ventilation is possible. A battery 118, a control circuit 342, and various kinds of actuator are housed inside the base frame 308.

The main body frame 310 is formed of a resin material, and includes a head portion frame 316 and a trunk portion frame 318. The head portion frame 316 is of a hollow hemispherical form, and forms a head portion framework of the robot 100. The trunk portion frame 318 is of a stepped cylindrical form, and forms a trunk portion framework of the robot 100. The trunk portion frame 318 is integrally fixed to the base frame 308. The head portion frame 316 is attached to an upper end portion of the trunk portion frame 318 so as to be relatively displaceable.

Three shafts, those being a yaw shaft 320, a pitch shaft 322, and a roll shaft 324, and an actuator 326 for driving each shaft so as to rotate, are provided in the head portion frame 316. The actuator 326 includes a multiple of servo motors for driving each shaft individually. The yaw shaft 320 is driven for a head shaking action, the pitch shaft 322 is driven for a nodding action, and the roll shaft 324 is driven for a head tilting action.

A plate 325 that supports the yaw shaft 320 is fixed to an upper portion of the head portion frame 316. A multiple of ventilation holes 327 for securing ventilation between upper and lower portions are formed in the plate 325.

A base plate 328 made of metal is provided so as to support the head portion frame 316 and an internal mechanism thereof from below. The base plate 328 is linked to the plate 325 via a crosslink mechanism 329 (a pantagraph mechanism), and is linked to the upper plate 332 (the base frame 308) via a joint 330.

The trunk portion frame 318 houses the base frame 308 and a wheel drive mechanism 370. The wheel drive mechanism 370 includes a pivot shaft 378 and an actuator 379. A lower half portion of the trunk portion frame 318 is of a small width in order to form a housing space S of the front wheel 102 between the wheel covers 312.

The outer skin 314 is formed of urethane rubber, and covers the main body frame 310 and the wheel covers 312 from an outer side. The arms 106 are molded integrally with the outer skin 314. An aperture portion 390 for introducing external air is provided in an upper end portion of the outer skin 314.

Figure 4:
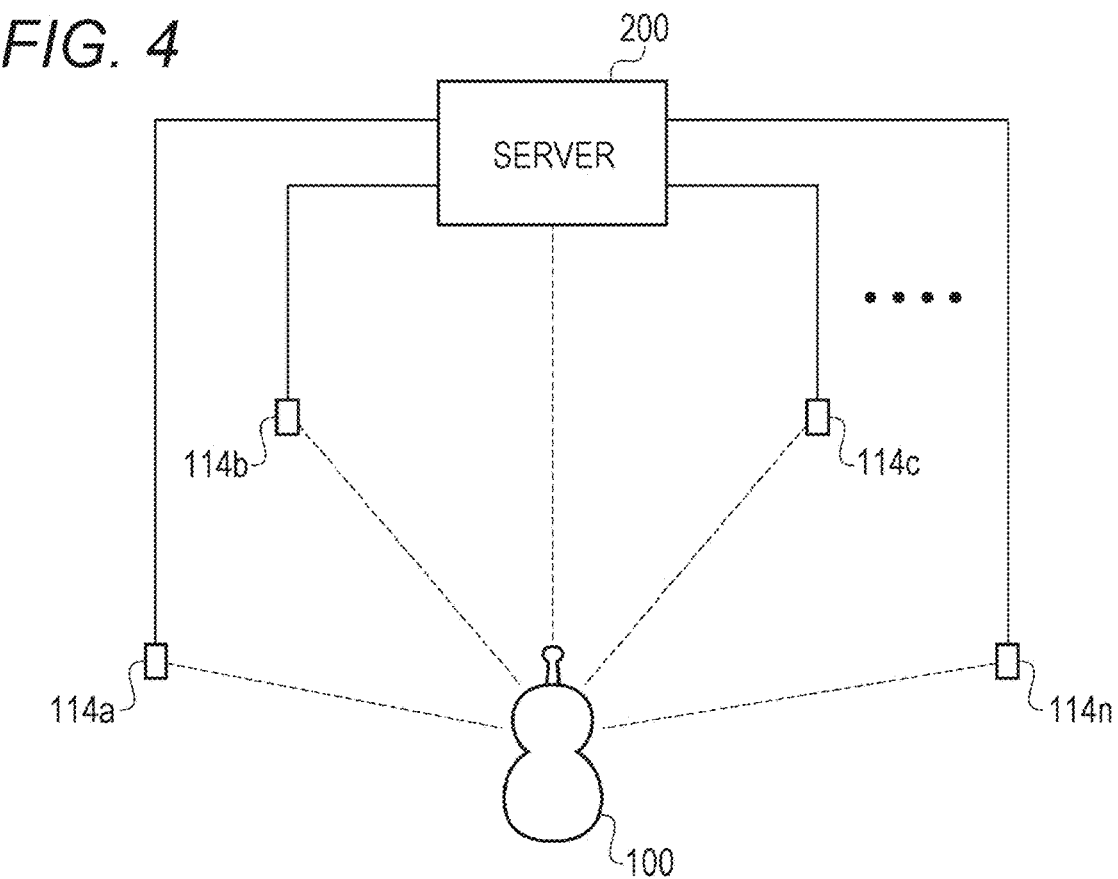
FIG. 4 is a configuration diagram of a robot system.

FIG. 4 is a configuration diagram of a robot system 300.

The robot system 300 includes the robot 100, the server 200, and a multiple of external sensors 114. The multiple of external sensors 114 (external sensors 114a, 1144b, and so on to 114n) are installed in advance in a house. The external sensor 114 may be fixed to a wall surface of the house, or may be placed on a floor. Positional coordinates of the external sensor 114 are registered in the server 200. The positional coordinates are defined as x, y coordinates in the house envisaged to be an action range of the robot 100.

The server 200 is installed in the house. The server 200 and the robot 100 in this embodiment correspond one-to-one. The server 200 determines a basic action of the robot 100 based on information obtained from the sensors incorporated in the robot 100 and the multiple of external sensors 114.

The external sensor 114 is for reinforcing sensory organs of the robot 100, and the server 200 is for reinforcing brainpower of the robot 100.

The external sensor 114 regularly transmits a wireless signal (hereafter called a "robot search signal") including ID (hereafter called "beacon ID") of the external sensor 114. On receiving the robot search signal, the robot 100 returns a wireless signal (hereafter called a "robot response signal") including beacon ID. The server 200 measures a time from the external sensor 114 transmitting the robot search signal until receiving the robot response signal, and measures a distance from the external sensor 114 to the robot 100. By measuring the distance between each of the multiple of external sensors 114 and the robot 100, the server 200 identifies the positional coordinates of the robot 100.

Of course, a method whereby the robot 100 regularly transmits its own positional coordinates to the server 200 may also be adopted.

Figure 5:
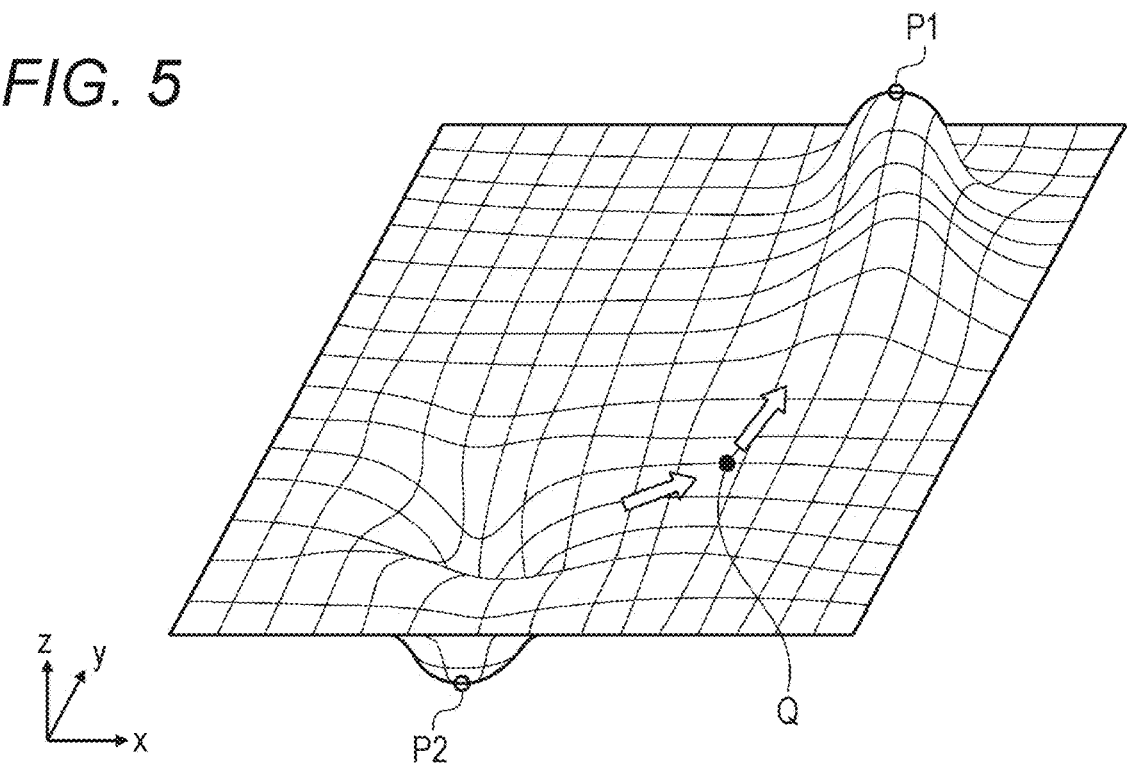
FIG. 5 is a schematic view of an emotion map.

FIG. 5 is a schematic view of an emotion map 116.

The emotion map 116 is a data table stored in the server 200. The robot 100 selects an action in accordance with the emotion map 116. The emotion map 116 shown in FIG. 5 shows a magnitude of an emotional attachment or aversion to a place of the robot 100. An x axis and a y axis of the emotion map 116 indicate two-dimensional spatial coordinates. A z axis indicates a magnitude of an emotional attachment or aversion. When a z value is a positive value, an attachment to the place is high, and when the z value is a negative value, the robot 100 is averse to the place.

On the emotion map 116 of FIG. 5, a coordinate P1 is a point in an indoor space managed by the server 200 as the action range of the robot 100 at which an emotion of attraction is high (hereafter called a favored point). The favored point may be a "safe place", such as behind a sofa or under a table, or may be a place in which people tend to gather or a lively place, like a living room. Also, the safe place may be a place where the robot 100 has been gently stroked or touched in the past.

A definition of what kind of place the robot 100 favors is arbitrary, but it is generally desirable that a place favored by small children, or by small animals such as dogs or cats, is set as a favored point.

A coordinate P2 is a point at which an emotion of aversion is high (hereafter called a "disliked point"). The disliked point may be a place where there is a loud noise, such as near a television, a place where there is likely to be a leak, like a bathroom or a washroom, an enclosed space or a dark place, a place where the robot 100 has been roughly treated by a user and that invokes an unpleasant memory, or the like.

A definition of what kind of place the robot 100 dislikes is also arbitrary, but it is generally desirable that a place feared by small children, or by small animals such as dogs or cats, is set as a disliked point.

A coordinate Q indicates a current position of the robot 100. The server 200 identifies positional coordinates of the robot 100, using the robot search signal regularly transmitted by the multiple of external sensors 114 and the robot response signal responding to the robot search signal. For example, when the external sensor 114 with beacon ID=1 and the external sensor 114 with beacon ID=2 each detect the robot 100, the server 200 obtains the distances of the robot 100 from the two external sensors 114, and obtains the positional coordinates of the robot 100 from the distances.

Alternatively, the external sensor 114 with beacon ID=1 transmits the robot search signal in a multiple of directions, and the robot 100 returns the robot response signal when receiving the robot search signal. By so doing, the server 200 may ascertain in which direction, and at what distance, the robot 100 is from which external sensor 114. Also, in another embodiment, the server 200 may calculate a distance moved by the robot 100 from the rotational speed of the front wheel 102 or the rear wheel 103, thereby identifying the current position, or may identify the current position based on an image obtained from the camera.

When the emotion map 116 shown in FIG. 5 is provided, the robot 100 moves in a direction toward the favored point (coordinate P1), or in a direction away from the disliked point (coordinate P2).

The emotion map 116 changes dynamically. When the robot 100 arrives at the coordinate P1, the z value (emotion of attraction) at the coordinate P1 decreases with the passing of time. Because of this, the robot 100 can emulate animal-like behavior of arriving at the favored point (coordinate P1), "being emotionally satisfied", and in time "getting bored" with the place. In the same way, the emotion of aversion at the coordinate P2 is alleviated with the passing of time. A new favored point or disliked point appears together with the elapse of time, because of which the robot 100 carries out a new action selection. The robot 100 has "interest" in a new favored point, and ceaselessly carries out a new action selection.

The emotion map 116 expresses emotional swings as an internal state of the robot 100. The robot 100 heads for a favored point, avoids a disliked point, stays for a while at the favored point, and in time performs the next action. With this kind of control, the action selection of the robot 100 can be a human-like or animal-like action selection.

Maps that affect an action of the robot 100 (hereafter collectively called "action maps") are not limited to the type of emotion map 116 shown in FIG. 5. For example, various action maps such as curiosity, a desire to avoid fear, a desire to seek security, and a desire to seek physical ease such as quietude, low light, coolness, or warmth, can be defined. Further, an objective point of the robot 100 may be determined by taking a weighted average of the z values of each of a multiple of action maps.

The robot 100 may also have, in addition to an action map, parameters that indicate a magnitude of various emotions or senses. For example, when a value of a loneliness emotion parameter is increasing, a weighting coefficient of an action map that evaluates places in which the robot 100 feels at ease may be set high, and the value of this emotion parameter reduced by the robot 100 reaching a target point. In the same way, when a value of a parameter indicating a sense of boredom is increasing, it is sufficient that a weighting coefficient of an action map that evaluates places in which curiosity is satisfied is set high.

Figure 6:
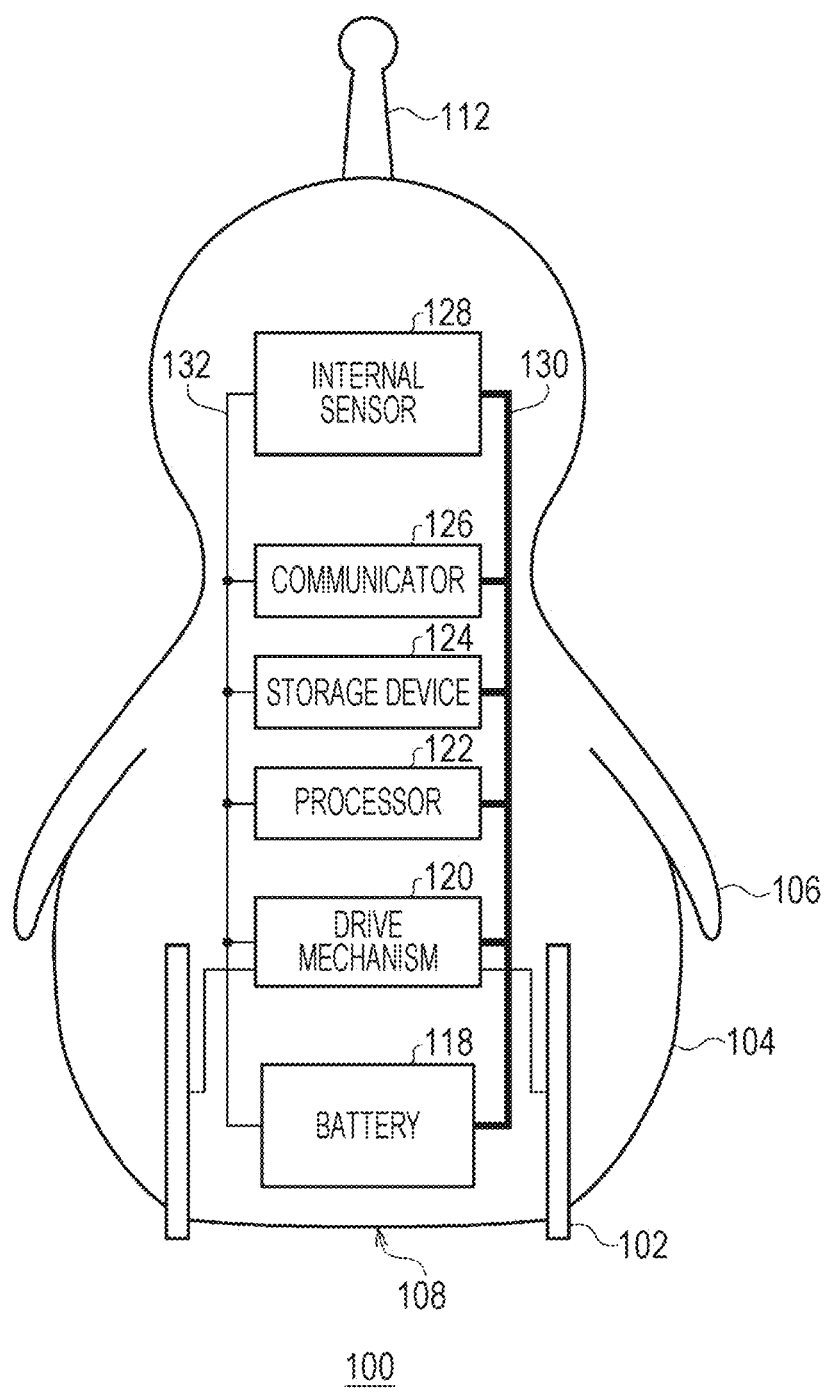
FIG. 6 is a hardware configuration diagram of the robot.

FIG. 6 is a hardware configuration diagram of the robot 100.

The robot 100 includes an internal sensor 128, a communicator 126, a storage device 124, a processor 122, a drive mechanism 120, and the battery 118. The drive mechanism 120 includes the heretofore described wheel drive mechanism 370. The processor 122 and the storage device 124 are included in the control circuit 342. The units are connected to each other by a power line 130 and a signal line 132. The battery 118 supplies power to each unit via the power line 130. Each unit transmits and receives a control signal via the signal line 132. The battery 118 is a lithium ion rechargeable battery, and is a power source of the robot 100.

The internal sensor 128 is a collection of various kinds of sensor incorporated in the robot 100. Specifically, the internal sensor 128 is a camera, a highly directional microphone, an infrared sensor, a thermosensor, a touch sensor, an acceleration sensor, a smell sensor, and the like. The smell sensor is an already known sensor that applies a principle that electrical resistance changes in accordance with an adsorption of a molecule forming a source of a smell. The smell sensor classifies various smells into multiple kinds of category (hereafter called "smell categories").

The communicator 126 is a communication module that carries out wireless communication with the server 200 and various kinds of external device, such as the external sensor 114 and a mobile device possessed by a user, as a target. The storage device 124 is configured of a non-volatile memory and a volatile memory, and stores a computer program and various kinds of setting information. The processor 122 is means of executing a computer program. The drive mechanism 120 is an actuator that controls an internal mechanism. In addition to this, an indicator, a speaker, and the like are also mounted.

The processor 122 selects an action of the robot 100 while communicating with the server 200 or the external sensor 114 via the communicator 126. Various kinds of external information obtained by the internal sensor 128 also affect the action selection. The drive mechanism 120 mainly controls the wheels (front wheels 102) and the head portion (the head portion frame 316). The drive mechanism 120 changes a direction of movement and a movement speed of the robot 100 by changing the rotational speed and the direction of rotation of each of the two front wheels 102. Also, the drive mechanism 120 can also raise and lower the wheels (the front wheels 102 and the rear wheel 103). When the wheels rise, the wheels are completely stored in the body 104, and the robot 100 comes into contact with the floor surface F via the seating face 108, taking on the sitting state.

Figure 7:
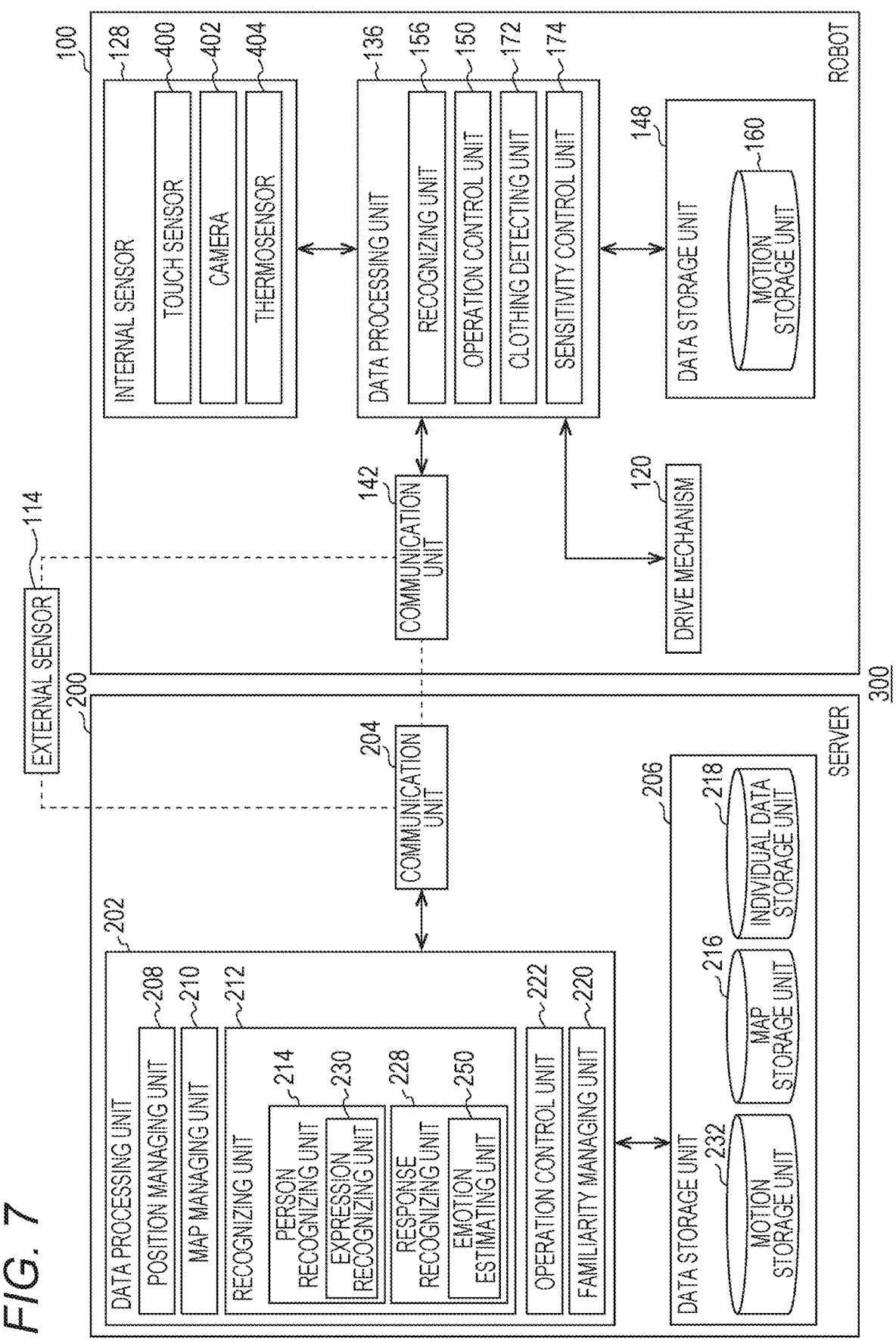
FIG. 7 is a functional block diagram of the robot system.

FIG. 7 is a functional block diagram of the robot system 300.

As heretofore described, the robot system 300 includes the robot 100, the server 200, and the multiple of external sensors 114. Each component of the robot 100 and the server 200 is realized by hardware including a computer formed of a CPU (central processing unit), various kinds of coprocessor, and the like, a storage device that is a memory or storage, and a wired or wireless communication line that links the computer and the storage device, and software that is stored in the storage device and supplies a processing command to the computer. A computer program may be configured of a device driver, an operating system, various kinds of application program positioned in an upper layer thereof, and a library that provides a common function to the programs. Each block described hereafter indicates a functional unit block rather than a hardware unit configuration.

One portion of the functions of the robot 100 may be realized by the server 200, and one portion or all of the functions of the server 200 may be realized by the robot 100.

Server 200

The server 200 includes a communication unit 204, a data processing unit 202, and a data storage unit 206.

The communication unit 204 manages a process of communicating with the external sensor 114 and the robot 100. The data storage unit 206 stores various kinds of data. The data processing unit 202 executes various kinds of process based on data acquired by the communication unit 204 and data stored in the data storage unit 206. The data processing unit 202 also functions as an interface of the communication unit 204 and the data storage unit 206.

The data storage unit 206 includes a motion storage unit 232, a map storage unit 216, and an individual data storage unit 218.

The robot 100 has a multiple of operation patterns (motions). Various motions, such as waving a hand, approaching a user while meandering, and staring at a user with the head to one side, are defined.

The motion storage unit 232 stores a "motion file" that defines control details of a motion. Each motion is identified by motion ID. The motion file is also downloaded into a motion storage unit 160 of the robot 100. Which motion is to be executed may be determined by the server 200, or may be determined by the robot 100.

Many motions of the robot 100 are configured as compound motions that include a multiple of unit motions. For example, when the robot 100 approaches an owner, the approach may be expressed as a combination of a unit motion of changing direction to face the owner, a unit motion of approaching while raising an arm, a unit motion of approaching while shaking the body, and a unit motion of sitting while raising both arms. By combining these kinds of four motions, a motion of "approaching an owner, raising one arm on the way, and finally sitting after shaking the body" is realized. An angle of rotation, angular velocity, and the like of an actuator provided in the robot 100 is defined correlated to a time axis in a motion file. Various motions are performed by each actuator being controlled together with the passing of time in accordance with the motion file (actuator control information).

A shift time for changing from a preceding unit motion to a subsequent unit motion is called an "interval". It is sufficient that an interval is defined in accordance with time needed for a unit motion change or details of a motion. A length of an interval can be regulated.

Hereafter, settings involved in controlling an action of the robot 100, such as which motion is chosen and when, and output regulation of each actuator when realizing a motion, will collectively be called "behavioral characteristics". The behavioral characteristics of the robot 100 are defined by a motion selection algorithm, a selection probability of a motion chosen in response to various situations, a motion file, and the like.

The map storage unit 216 stores a multiple of act ion maps. The individual data storage unit 218 stores information on a user, and in particular, on an owner. Specifically, the individual data storage unit 218 stores various kinds of parameter, such as familiarity with respect to a user, and physical characteristics and behavioral characteristics of a user. The individual data storage unit 218 may also store other attribute information such as age and gender.

The robot 100 identifies a user based on the user's physical characteristics or behavioral characteristics. The robot 100 constantly films a periphery using the incorporated camera. Further, the robot 100 extracts the physical characteristics and behavioral characteristics of a person appearing in an image. The physical characteristics may be visual characteristics inherent to a body, such as a height, clothes worn by choice, a presence or absence of spectacles, a skin color, a hair color, or an ear size, or may also include other characteristics such as an average body temperature, a smell, and a voice quality. The behavioral characteristics, specifically, are characteristics accompanying behavior, such as a place the user favors, a briskness of movement, and a presence or absence of smoking. For example, the robot 100 extracts behavioral characteristics such that an owner identified as a father is often out of the home, and is often motionless on a sofa when at home, but a mother is often in a kitchen, and an activity range is broad.

The robot 100 clusters users appearing with a high frequency as "owners" based on physical characteristics and behavioral characteristics obtained from a large amount of image information or other sensing information.

Although the method of identifying a user from user ID is simple and reliable, the user having a device that can provide user ID is a precondition. Meanwhile, the method of identifying a user from physical characteristics or behavioral characteristics is such that an image recognition process is weighty, but there is an advantage in that even a user who does not have a mobile device can be identified. One of the two methods may be employed alone, or user identification may be carried out using the two methods together in a complementary way.

In this embodiment, users are clustered based on physical characteristics and behavioral characteristics, and a user is identified using deep learning (a multilayer neural network). Details will be described hereafter.

The robot 100 has a familiarity internal parameter for each user. When the robot 100 recognizes an action indicating a liking toward the robot 100, such as picking the robot 100 up or speaking to the robot 100, familiarity with respect to that user increases. Familiarity decreases with respect to a user not involved with the robot 100, a user who behaves roughly, or a user met infrequently.

The data processing unit 202 includes a position managing unit 208, a map managing unit 210, a recognizing unit 212, an operation control unit 222, and a familiarity managing unit 220.

The position managing unit 208 identifies the positional coordinates of the robot 100 using the method described using FIG. 4. The position managing unit 208 may also track positional coordinates of a user in real time.

The map managing unit 210 changes the parameter of each coordinate on the multiple of action maps using the method described in connection with FIG. 5. The map managing unit 210 may select one of the multiple of action maps, or may take a weighted average of the z values of the multiple of action maps. For example, it is taken that the z values at a coordinate R1 and a coordinate R2 on an action map A are 4 and 3, and the z values at the coordinate R1 and the coordinate R2 on an action map B are −1 and 3. When taking a simple average, the total z value at the coordinate R1 is 4−1=3, and the total z value at the coordinate R2 is 3+3=6, because of which the robot 100 heads in the direction of the coordinate R2 rather than the coordinate R1.

When the action map A is weighted 5 times with respect to the action map B, the total z value at the coordinate R1 is 4×5−1=19, and the total z value at the coordinate R2 is 3×5+3=18, because of which the robot 100 heads in the direction of the coordinate R1.

The recognizing unit 212 recognizes an external environment. Various kinds of recognition, such as recognition of weather or season based on temperature and humidity, and recognition of shelter (a safe area) based on an amount of light and temperature, are included in the recognition of the external environment. The recognizing unit 212 further includes a person recognizing unit 214 and a response recognizing unit 228. The person recognizing unit 214 recognizes a person from an image filmed by the camera incorporated in the robot 100, and extracts the physical characteristics and behavioral characteristics of the person. Further, based on the physical characteristic information and behavioral characteristic information registered in the individual data storage unit 218, the person recognizing unit 214 determines what person, such as a father, a mother, or an eldest son, the user filmed, that is, the user the robot 100 is looking at, corresponds to. The person recognizing unit 214 includes an expression recognizing unit 230. The expression recognizing unit 230 estimates an emotion of a user using image recognition of an expression of the user.

The person recognizing unit 214 also extracts characteristics of a moving object other than a person, for example, a cat or a dog that is a pet.

The response recognizing unit 228 recognizes various responsive actions performed by a user with respect to the robot 100, and classifies the actions as pleasant or unpleasant actions. The response recognizing unit 228 includes an emotion estimating unit 250. The emotion estimating unit 250 estimates an emotion of a user based on physical contact by the user with the robot 100, and identifies an affection expression level. The affection expression level is a parameter wherein an emotion of a user toward the robot 100 is estimated (to be described hereafter).

Pleasant and unpleasant actions are distinguished depending on whether a responsive action of a user is pleasant or unpleasant for a living creature. For example, being hugged is a pleasant action for the robot 100, and being kicked is an unpleasant action for the robot 100. It is determined that a possibility of a user who performs a pleasant action having a positive emotion is high, and a possibility of a user who performs an unpleasant action having a negative emotion is high.

The operation determining unit 222 of the server 200 determines a motion of the robot 100 in cooperation with an operation control unit 150 of the robot 100. The operation determining unit 222 of the server 200 compiles a movement target point of the robot 100, and a movement route for the movement target point, based on an action map selection by the map managing unit 210. The operation determining unit 222 compiles a multiple of movement routes, and having done so, may select any of the movement routes.

The operation control unit 222 selects a motion of the robot 100 from a multiple of motions of the motion storage unit 232. A selection probability is correlated for each situation to each motion. For example, a selection method such that a motion A is executed with a probability of 20% when a pleasant action is performed by a user, and a motion B is executed with a probability of 5% when an air temperature is 30° C. or higher, is defined.

A movement target point and a movement route are determined by an action map, and a motion is selected in accordance with various kinds of event to be described hereafter.

The familiarity managing unit 220 manages familiarity for each user. As heretofore described, familiarity is registered as one portion of individual data in the individual data storage unit 218. When a pleasant action is detected, the familiarity managing unit 220 increases familiarity with respect to that user. When an unpleasant action is detected, the familiarity managing unit 220 reduces familiarity. Also, familiarity of an owner who has not been visually recognized for a long period gradually decreases.

Robot 100

The robot 100 includes a communication unit 142, a data processing unit 136, a data storage unit 148, the internal sensor 128, and the drive mechanism 120.

The communication unit 142 corresponds to the communicator 126 (refer to FIG. 6), and manages a process of communicating with the external sensor 114 and the server 200. The data storage unit 148 stores various kinds of data. The data storage unit 148 corresponds to the storage device 124 (refer to FIG. 6). The data processing unit 136 executes various kinds of process based on data acquired by the communication unit 142 and data stored in the data storage unit 148. The data processing unit 136 corresponds to the processor 122 and a computer program executed by the processor 122. The data processing unit 136 also functions as an interface of the communication unit 142, the internal sensor 128, the drive mechanism 120, and the data storage unit 148.

The internal sensor 128 includes the touch sensor 400, a camera 402, and a thermosensor 404.

The touch sensor 400 detects contact by a user on the body 104. The camera 402 constantly films a periphery of the robot 100. The thermosensor 404 regularly detects an external air temperature distribution in the periphery of the robot 100. By a predetermined processing such as an image processing being performed on information obtained from the camera 402 and the thermosensor 404, whether or not a user exists in the periphery can be detected.

The data storage unit 148 includes the motion storage unit 160, which defines various kinds of motion of the robot 100.

Various kinds of motion file are downloaded from the motion storage unit 232 of the server 200 into the motion storage unit 160 of the robot 100. A motion is identified by motion ID. An operating timing, an operating time, an operating direction, and the like, of the various kinds of actuator (the drive mechanism 120) are defined chronologically in order to perform various motions such as sitting by housing the front wheel 102, raising the arm 106, causing the robot 100 to carry out a rotating action by causing the two front wheels 102 to rotate in reverse or by causing only one front wheel 102 to rotate, shaking by causing the front wheel 102 to rotate in a state in which the front wheel 102 is housed, or stopping once and looking back when moving away from a user.

The data processing unit 136 includes a recognizing unit 156, the operation control unit 150, a clothing detecting unit 172, and a sensitivity control unit 174.

The operation control unit 150 of the robot 100 determines motions of the robot 100 in cooperation with the operation control unit 222 of the server 200. One portion of motions may be determined by the server 200, and other motions may be determined by the robot 100. Also, a configuration may be such that although the robot 100 determines motions, the server 200 determines a motion when a processing load of the robot 100 is high. A configuration may be such that a motion forming a base is determined by the server 200, and an additional motion is determined by the robot 100. It is sufficient that the way a motion determining process is divided between the server 200 and the robot 100 is designed in accordance with specifications of the robot system 300.

The operation control unit 150 of the robot 100 determines a direction of movement of the robot 100 together with the operation control unit 222 of the server 200. Movement based on an action map may be determined by the server 200, and an immediate movement such as avoiding an obstacle may be determined by the operation control unit 150 of the robot 100. The drive mechanism 120 causes the robot 100 to head toward a movement target point by driving the front wheel 102 in accordance with an instruction from the operation control unit 150.

The operation control unit 150 of the robot 100 instructs the drive mechanism 120 to execute a selected motion. The drive mechanism 120 controls each actuator in accordance with the motion file.

The operation control unit 150 can also execute a motion of holding up both arms 106 as a gesture asking for "a hug" when a user with a high degree of familiarity is nearby, and can also perform a motion of no longer wanting to be hugged by alternately and repeatedly causing the right and left front wheels 102 to rotate in reverse and stop in a housed state when bored of the "hug". The drive mechanism 120 causes the robot 100 to perform various motions by driving the front wheels 102, the arm 106, and the neck (the head unit frame 316) in accordance with an instruction from the operation control unit 150.

When a responsive action indicating a strong expression of affection, for example, physical contact such as hugging the robot 100 tight, is detected, the operation control unit 150 selects a predetermined motion such as further entrusting the body to the user, and rubbing the face against the user.

The sensitivity control unit 174 causes sensitivity, specifically detection voltage, of the touch sensor 400 to change. This will be described in detail hereafter.

The clothing detecting unit 172 detects a wearing of the clothing 180 by detecting the clothing ID from the RFID tag of the clothing 180. The clothing ID can be read when within close range. When multiple items of clothing ID are read, it is determined that the robot 100 is wearing clothing in layers. A wearing of clothing may be detected using various methods other than the RFID tag. For example, it may be determined that clothing has been put on when an internal temperature of the robot 100 rises. Clothing worn may be recognized from an image using the camera. When the touch sensor 400 detects contact over a wide range, it may be determined that clothing has been put on.

The recognizing unit 156 of the robot 100 analyzes external information obtained from the internal sensor 128. The recognizing unit 156 is capable of visual recognition (a visual unit), smell recognition (an olfactory unit), sound recognition (an aural unit), and tactile recognition (a tactile unit).

The recognizing unit 156 regularly films an exterior angle using the incorporated camera (the internal sensor 128), and detects a moving object such as a person or a pet. The recognizing unit 156 carries out an extraction of characteristics from an image or the like. The characteristics are transmitted to the server 200, and the person recognizing unit 214 of the server 200 extracts the physical characteristics of the moving object. Also, the recognizing unit 156 also detects a smell of the user and a voice of the user. Smell and sound (voice) are classified into multiple kinds using an already known method.

When a strong force is applied to the robot 100, the recognizing unit 156 recognizes this using an incorporated acceleration sensor, and the response recognizing unit 228 of the server 200 recognizes that a "violent action" has been performed by a user in the vicinity. When a user picks the robot 100 up by grabbing the horn 112, this may also be recognized as a violent action. When a user in a state of confronting the robot 100 speaks in a specific volume region and a specific frequency band, the response recognizing unit 228 of the server 200 may recognize that a "speaking action" has been performed with respect to the robot 100. Also, when a temperature in the region of body temperature is detected, the response recognizing unit 228 of the server 200 recognizes that a "touching action" has been performed by a user, and when upward acceleration is detected in a state in which touching is recognized, the response recognizing unit 228 of the server 200 recognizes that a "hug" has been performed. Physical contact when a user raises the body 104 may also be sensed, and a hug may also be recognized by a load acting on the front wheels 102 decreasing.

The affection expression level is identified in accordance with details of a responsive action, specifically, an aspect of physical contact. Various aspects, such as hugging tight, rubbing cheeks, and stroking the head, exist as physical contact. Hereafter, an aspect of physical contact is referred to as a "contact aspect". In general, almost all responsive actions that are pleasant actions are of a high affection expression level, and almost all responsive actions that are unpleasant actions are of a low affection expression level. Pleasant and unpleasant actions are related to familiarity, and the affection expression level affects the action selection of the robot 100.

A series of recognition processes may be carried out by the recognizing unit 212 of the server 200 alone, or carried out by the recognizing unit 156 of the robot 100 alone, or the two may execute the recognition processes while dividing roles.

The familiarity managing unit 220 of the server 200 changes the familiarity toward a user in accordance with a responsive action recognized by the recognizing unit 156. Essentially, the familiarity toward a user who carries out a pleasant action increases, while the familiarity toward a user who carries out an unpleasant action decreases.

The recognizing unit 212 of the server 200 may determine whether a response is pleasant or unpleasant, and the map managing unit 210 of the server 200 may change the z value of the point at which the pleasant or unpleasant action has been carried out on an action map that represents "attachment to a place". For example, when a pleasant action is carried out in a living room, the map managing unit 210 may set a favored point at a high probability in the living room. In this case, a positive feedback advantage is realized in that the robot 100 favors the living room, and further favors the living room due to being the recipient of a pleasant action in the living room.

The person recognizing unit 214 of the server 200 detects a moving object from various kinds of data obtained from the external sensor 114 or the internal sensor 128, and extracts characteristics (physical characteristics and behavioral characteristics) thereof. Further, the person recognizing unit 214 cluster analyzes multiple moving objects based on these characteristics. Not only a human, but also a pet such as a dog or cat, may be a target of analysis as a moving object.

The robot 100 regularly carries out image filming, and the person recognizing unit 214 recognizes a moving object from the images, and extracts characteristics of the moving object. When a moving object is detected, physical characteristics and behavioral characteristics are also extracted from the smell sensor, the incorporated highly directional microphone, the temperature sensor, and the like. For example, when a moving object appears in an image, various characteristics are extracted, such as having a beard, being active early in the morning, wearing red clothing, smelling of perfume, having a loud voice, wearing spectacles, wearing a skirt, having white hair, being tall, being plump, being suntanned, or being on a sofa.

When a moving object (user) having a beard is often active early in the morning (gets up early) and rarely wears red clothing, a first profile that is a cluster (user) that gets up early, has a beard, and does not often wear red clothing is created. Meanwhile, when a moving object wearing spectacles often wears a skirt, but the moving object does not have a beard, a second profile that is a cluster (user) that wears spectacles and wears a skirt, but definitely does not have a beard, is created.

Although the above is a simple example, the first profile corresponding to a father and the second profile corresponding to a mother are formed using the heretofore described method, and the robot 100 recognizes that there at least two users (owners) in this house.

Note that the robot 100 does not need to recognize that the first profile is the "father". In all cases, it is sufficient that the robot 100 can recognize a figure that is "a cluster that has a beard, often gets up early, and hardly ever wears red clothing".

It is assumed that the robot 100 newly recognizes a moving object (user) in a state in which this kind of cluster analysis is completed.

At this time, the person recognizing unit 214 of the server 200 extracts characteristics from sensing information of an image or the like obtained from the robot 100, and determines which cluster a moving object near the robot 100 corresponds to using deep learning (a multilayer neural network). For example, when a moving object that has a beard is detected, the probability of the moving object being the father is high. When the moving object is active early in the morning, it is still more certain that the moving object corresponds to the father. Meanwhile, when a moving object that wears spectacles is detected, there is a possibility of the moving object being the mother. When the moving object has a beard, the moving object is neither the mother nor the father, because of which the person recognizing unit 214 determines that the moving object is a new person who has not been cluster analyzed.

Formation of a cluster by characteristic extraction (cluster analysis) and application to a cluster accompanying characteristic extraction (deep learning) may be executed concurrently.

Familiarity toward a moving object (user) changes in accordance with how the robot 100 is treated by the user.

The robot 100 sets a high familiarity for a frequently met person, a person who frequently touches the robot 100, and a person who frequently speaks to the robot 100. Meanwhile, familiarity decreases for a rarely seen person, a person who does not often touch the robot 100, a violent person, and a person who scolds in a loud voice. The robot 100 changes the familiarity of each user based on various items of exterior angle information detected by the sensors (visual, tactile, and aural).

The actual robot 100 autonomously carries out a complex action selection in accordance with an action map. The robot 100 acts while being affected by a multiple of action maps based on various parameters such as loneliness, boredom, and curiosity. When the effect of the action maps is removed, or when in an internal state in which the effect of the action maps is small, the robot 100 essentially attempts to approach a person with high familiarity, and attempts to move away from a person with low familiarity.

Actions of the robot 100 are classified below in accordance with familiarity.

(1) A cluster with extremely high familiarity

The robot 100 strongly expresses a feeling of affection by approaching a user (hereafter called "an approaching action"), and by performing an affectionate gesture defined in advance as a gesture indicating goodwill toward a person.

(2) A cluster with comparatively high familiarity

The robot 100 carries out only an approaching action.

(3) A cluster with comparatively low familiarity

The robot 100 does not carry out any special action.

(4) A cluster with particularly low familiarity

The robot 100 carries out a withdrawing action.

According to the heretofore described control method, the robot 100 approaches the user when finding a user with high familiarity, and conversely, moves away from the user when finding a user with low familiarity. According to this kind of control method, the robot 100 can express by behavior a so-called "shyness". Also, when a visitor (a user A with low familiarity) appears, the robot 100 may move away from the visitor and head toward a family member (a user B with high familiarity). In this case, user B can perceive that the robot 100 is shy and feeling uneasy, and relying on user B. Owing to this kind of behavioral expression, pleasure at being chosen and relied upon, and an accompanying feeling of affection, are evoked in user B.

Meanwhile, when user A, who is a visitor, visits frequently, and speaks to and touches the robot 100, familiarity of the robot 100 toward user A gradually rises, and the robot 100 ceases to perform an action of shyness (a withdrawing action) with respect to user A. User A can also feel affection toward the robot 100 by perceiving that the robot 100 has become accustomed to user A.

The heretofore described action selection need not necessarily be executed constantly. For example, when an internal parameter indicating curiosity of the robot 100 is high, weight is given to an action map from which a place in which the curiosity is satisfied is obtained, because of which there is also a possibility that the robot 100 does not select an action affected by familiarity. Also, when the external sensor 114 installed in the hall detects the return home of a user, the robot 100 may execute an action of greeting the user with maximum priority.

When sensing by a sensor other than the touch sensor 400, for example, the camera 402, the thermosensor 404, an unshown smell sensor, or the like, is impeded by contact from a user, the operation control unit 150 executes a notification operation. Specifically, when a certain ratio or more, for example 50% or more, of a field of view of the camera 402 is blocked, or when a certain ratio or more of a detection range of the thermosensor 404 is detected as being of the same temperature distribution, there is a possibility that a user's hand or body is impeding sensing. When it is determined by the recognizing unit 156 that a period for which sensing is impeded has continued for a predetermined time or longer, the operation control unit 150 executes a notification operation.

A notification operation is an operation of reporting to an owner the matter that there is a user or an obstacle, and that a sensor other than the touch sensor 400 cannot carry out sensing normally. Specifically, the operation control unit 150 executes a notification operation such as causing the eye to light up, emitting speech, shaking the body, or attempting to run away. It is sufficient that the notification operation is initially set in advance as a "typical operation (motion) when notifying of something" peculiar to the robot 100.

Figure 8:
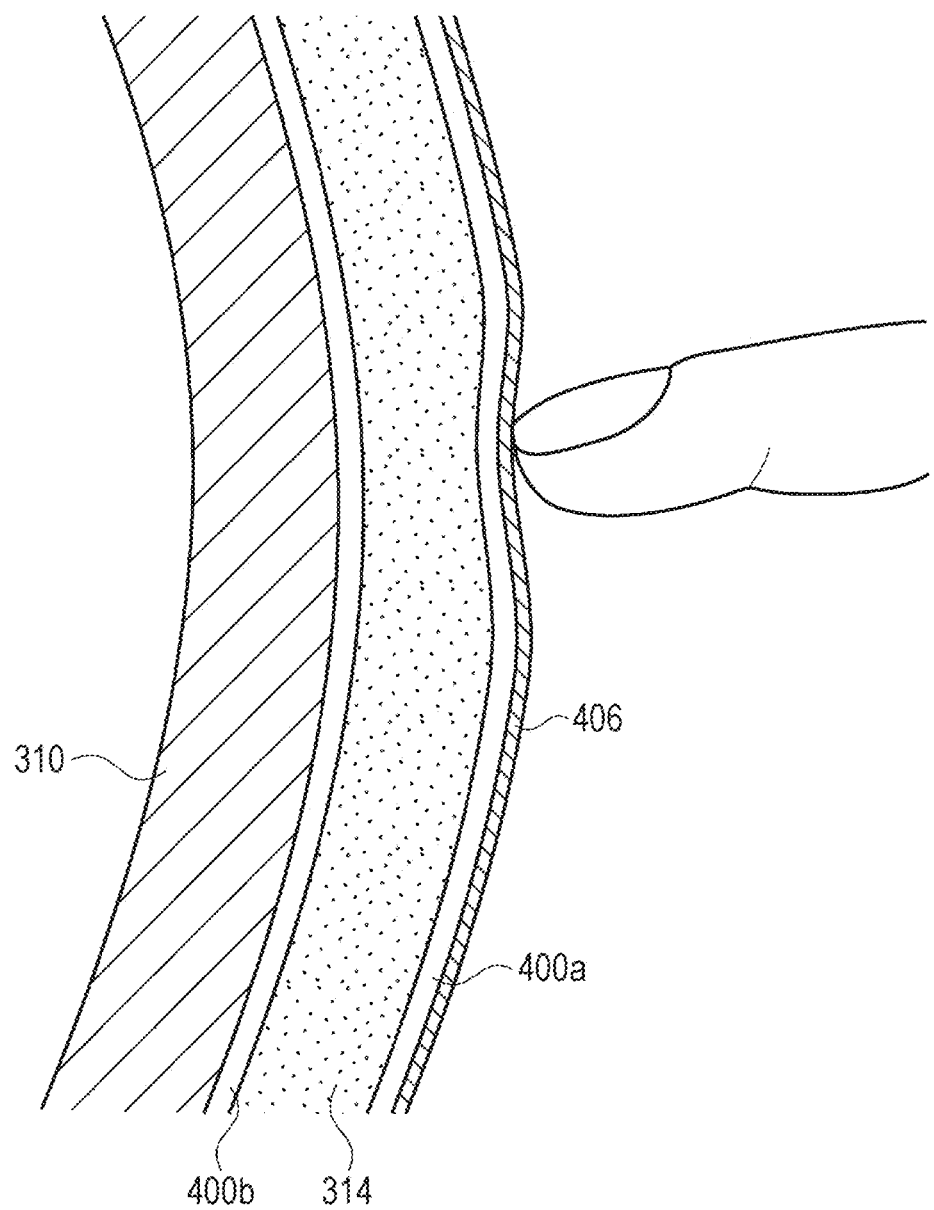
FIG. 8 is a sectional enlarged view of a body.

FIG. 8 is a sectional enlarged view of the body 104.

A second layer touch sensor 400b is sandwiched between the main body frame 310 and the outer skin 314. The second layer touch sensor 400b is installed along a curved form of the main body frame 310, which is made of resin. The outer skin 314 is made of urethane rubber (an elastic body). A covering skin 406 made of cloth is affixed to a surface of the outer skin 314, and a first layer touch sensor 400a is also installed along a curved form of the outer skin 314 between the outer skin 314 and the covering skin 406. That is, two touch sensors 400 form a double layer. The soft outer skin 314 is also a place a user feels a desire to touch. By the touch sensor 400 being disposed in a portion covered by the outer skin 314, a large variety of contacts from a user can be effectively detected.

The first touch sensor 400a may be installed on the covering skin 406.

When a user touches the covering skin 406, the first layer touch sensor 400a detects the contact. When a user presses the covering skin 406 hard, not only the first layer touch sensor 400a but also the second layer touch sensor 400b detects the contact. That is, strength of contact can be determined by the two touch sensors 400 of differing depths. Generally, an electrostatic capacitance sensor is such that the smaller the distance between an object and the sensor, the greater a detected value becomes. When a user touches the body 104 hard, the outer skin 314 transforms, and a distance between skin of the user and the second layer touch sensor 400b decreases, because of which the value detected by the second layer touch sensor 400b changes. As the outer skin 314 does not transform unless a certain amount of force is applied, whether the robot 100 is being hugged tightly or being hugged gently can be detected by the second layer touch sensor 400b, which is in a deep portion.

Various contact aspects can be classified by a combination of contact place, contact strength, and contact time. When only the first layer touch sensor 400a detects a contact, the recognizing unit 156 recognizes the contact as a "light touch". When the first layer touch sensor 400a detects an intermittent contact, the recognizing unit 156 recognizes the contact as "being poked". When not only the first layer touch sensor 400a but also the second layer touch sensor 400b detects a contact continuously for a certain time, the recognizing unit 156 recognizes the contact as a "massage". When the first layer touch sensor 400a and the second layer touch sensor 400b simultaneously detect a momentary contact, the recognizing unit 156 recognizes the contact as "being hit". The recognizing unit 156 may recognize a "violent action" in combination with the incorporated acceleration sensor.

As the touch sensor 400 is provided over the whole of the robot 100, what kind of contact is being carried out can be comprehensively determined from a combination of contact places. For example, when a user lifts the robot 100 up with a hand on either side, contact is detected on both side portions of the trunk. Being lifted up can also be detected by the incorporated acceleration sensor. When a user places the robot 100 on a knee and has both hands on the trunk of the robot 100, contact is detected in the bottom portion and the trunk portion. At this time, contact on the trunk portion is not normally strong. According to this kind of contact aspect, a holding on a knee can be recognized. When hugging the robot 100 tightly from in front, contact is detected over a wide region such as the chest, the abdomen, the upper back, and the head portion, and the contact is strong.

Identification information for identifying the contact aspect (hereafter referred to as "contact aspect ID") is allotted to each contact aspect. The emotion estimating unit 250 identifies the contact aspect ID based on the combination of contact places and the contact strength. For example, the emotion estimating unit 250 may hold a table in which a combination of contact places and the contact aspect ID are correlated in advance, and identify the contact aspect ID by referring to the table. Also, a program module for determination may be prepared for each contact aspect, and a contact aspect may be identified by each module carrying out a predetermined determination process based on a signal from the touch sensor 400 or the internal sensor 128. Contact aspect ID is correlated to motion data held in the motion storage unit 232. The operation control unit 222 selects the motion correlated to the contact aspect ID. That is, by a motion being correlated in advance to each aspect of physical contact, the operation control unit 222 can select a motion that responds appropriately to an emotion of a user who has performed physical contact.

In another form, a configuration may be such that information indicating an emotion of the robot is correlated to motion data held in the motion storage unit 232, and the operation control unit 222 can select a motion in accordance with an emotion of the robot 100. That is, when the emotion of the robot 100 is one of "wanting to be indulged", a motion correlated to the emotion of wanting to be indulged is selected. An emotion of a user is integrated in each aspect of physical contact. The emotion estimating unit 250 holds information correlated to contact aspect ID and indicating an emotion of a user. Because of this, the robot 100 recognizes an aspect of physical contact received from a user, and can estimate the emotion of the user from the aspect. For example, information indicating an emotion of "you're cute" may be correlated to a contact aspect of "stroking the head".

The operation control unit 222 causes an emotion of the robot 100 itself to change in accordance with an emotion of a user estimated by the emotion estimating unit 250, and selects a motion in accordance with the emotion of the robot 100. The operation control unit 222 holds an emotion of the robot 100 itself with respect to an emotion of a user, correlated to the emotion of the user. For example, the emotion of "wanting to be indulged" is correlated as the emotion of the robot with respect to the emotion of a user of "you're cute". Because of this, the operation control unit 222 can determine an emotion of the robot 100 itself in accordance with an emotion of a user. Further, the operation control unit 222 retrieves motion data corresponding to an emotion of the robot 100 itself from the motion storage unit 232, and executes a motion. For example, the operation control unit 222 selects motion data correlated to the emotion of "wanting to be indulged". A multiple of emotions may be correlated as emotions of the robot 100 with respect to an emotion of a user, and one emotion is selected in accordance with familiarity toward the user, or the like.

By the touch sensor 400 being provided over practically the whole of the robot 100, how the robot 100 is touched by a user can be determined, and the current contact aspect can be identified from among the multiple of contact aspects. Although physical contact has various aspects, it is known that each contact aspect has a psychological meaning. This means that provided the contact aspect is known, an emotion of a user with respect to the robot 100 can be estimated. Further, by the robot 100 operating so as to respond appropriately to the estimated emotion of the user, the user feels pleasure, and has an emotion equivalent with that toward a living pet.

Also, the emotion estimating unit 250 determines an affection expression level in accordance with a contact aspect. A data table in which a contact aspect and an affection expression level that forms a base are correlated, as in an affection expression level of a simple touch being "+1" and an affection expression level of a hug being "+10", is prepared. The emotion estimating unit 250 identifies the affection expression level based on the data table. When a light touch is continued, the affection expression level is increased, but if the touch is continued too persistently, the affection expression level may be reduced.

The affection expression level also changes depending on contact strength. The affection expression level of a touch is "+1", but becomes double that at "+2" when the touch is strong. When a touch is particularly strong, it is seen as being a "hit". At this time, "10" is subtracted, and the affection expression level is identified as "−9 (=1−10)". The same applying to a hug, the affection expression level of a normal hug is "+10", but the affection expression level when hugging tightly is double that at "+20". The affection expression level of a hug strong enough to throttle is three times that of a normal hug, but familiarity decreases as the hug is unpleasant. A strong expression of affection is not necessarily pleasant for the robot 100, or in other words, is not necessarily a trigger for familiarity increasing.

Not being limited to a single affection expression level based on a responsive action, various motions are correlated in a motion selection table in accordance with an amount of change in an accumulated value of affection expression levels in a predetermined period, or an accumulated value per unit time. The operation control table 150 refers to the motion selection table, and selects a motion in accordance with an affection level.

When a pleasant action is detected, the familiarity managing unit 220 raises familiarity with respect to the user. When an unpleasant action is detected, the familiarity managing unit 220 reduces familiarity with respect to the user. Also, when an unpleasant action continues, and when an unpleasant action such as violence is recognized, the operation control unit 150 issues an instruction for an action of moving away from the user. Basically, "pleasant and unpleasant" affect behavioral characteristics via familiarity.

Furthermore, the emotion estimating unit 250 may determine an emotion in combination with an expression recognition by the expression recognizing unit 230. When an angry face and a laughing face can be recognized, an expression of a user can be more accurately determined. Even when an affection level identified based on a contact aspect is "+1", "−3" may be added to the affection expression level when the user's expression is an angry expression, and the affection expression level determined to be "−2". In the same way, even when an affection expression level when kicked by a user is "−50", it may be determined that the kick was unavoidable rather than deliberate when the user displays a dismayed expression, and the affection expression level may be corrected to "−20" by "+30" being added to the affection expression level.

When an affection expression level is high, or when an accumulated value of affection expression levels increases, the robot 100 selects a motion of hovering around in a vicinity of an owner, asking for a hug, or the like. When an affection expression level is low, the robot 100 may sit quietly in a place a little distanced from an owner. As behavioral characteristics of the robot 100 change in accordance with an emotion of an owner, the owner can recognize that the robot 100 may be adjusting to the owner in its own way. Basically, the affection expression level momentarily affects the behavioral characteristics of the robot 100.

When an affection expression level is high, the robot 100 may act energetically by execution of a motion being accelerated, and when an affection expression level is low, speed of executing a motion may be restricted. The interval may also be adjusted. A motion may be caused to change by one portion of unit motions configuring the motion being replaced or omitted in accordance with the affection expression level.

In this way, what kind of physical contact (contact aspect) is being performed is determined from the touch sensor 400, and the affection expression level is calculated in accordance with the contact aspect. A strong contact indicates a strong affection, but a contact that is too strong cannot be said to be affection. As physical contact is carried out as a manifestation of a natural emotion of a human, physical contact is a powerful source of information when estimating an emotion of an owner. Various setting methods, such as an action of stroking the head having an affection expression level of "+3", an action of hugging tightly, or specifically, an action of making contact with a wide region of the lower back portion, having an affection expression level of "+20", and an action of hugging tightly and bringing a cheek close, or specifically, an action of making contact not only with a wide region of the lower back portion but also the chest portion and the head portion, having an affection expression level of "+50", are conceivable in addition to the heretofore described examples.

To summarize, familiarity and an affection expression level are identified in accordance with a responsive action. Familiarity is a parameter that reflects a pleasant action and an unpleasant action, or in other words, a degree of pleasantness for the robot 100. The robot 100 increases familiarity with respect to an owner that performs a pleasant action, and reduces familiarity with respect to an owner that performs an unpleasant action. In time, a difference in familiarity has an effect on behavioral characteristics of the robot 100. Meanwhile, an affection expression level estimates an emotion of an owner from a responsive action, particularly a contact action, with respect to the robot 100. The operation control unit 150 selects various motions in accordance with the affection expression level. Normally, it is often the case that a contact action with a high affection expression level is a pleasant action.

A person's action of "touching", so-called physical contact, is such that a feeling of the person touching toward the person touched is easily expressed. It is said that a feeling that a subordinate is cute is expressed in an action of stroking a head. It is said that there is a mentality of wanting to be nearer a companion in an action of touching a cheek. For example, the robot 100 may select a motion of performing a gesture of wanting to be indulged by an owner when the head is stroked. When a cheek is touched, the robot 100 may select a motion of bringing the body into contact with the owner, and performing a gesture of asking for a hug.

Figure 9:
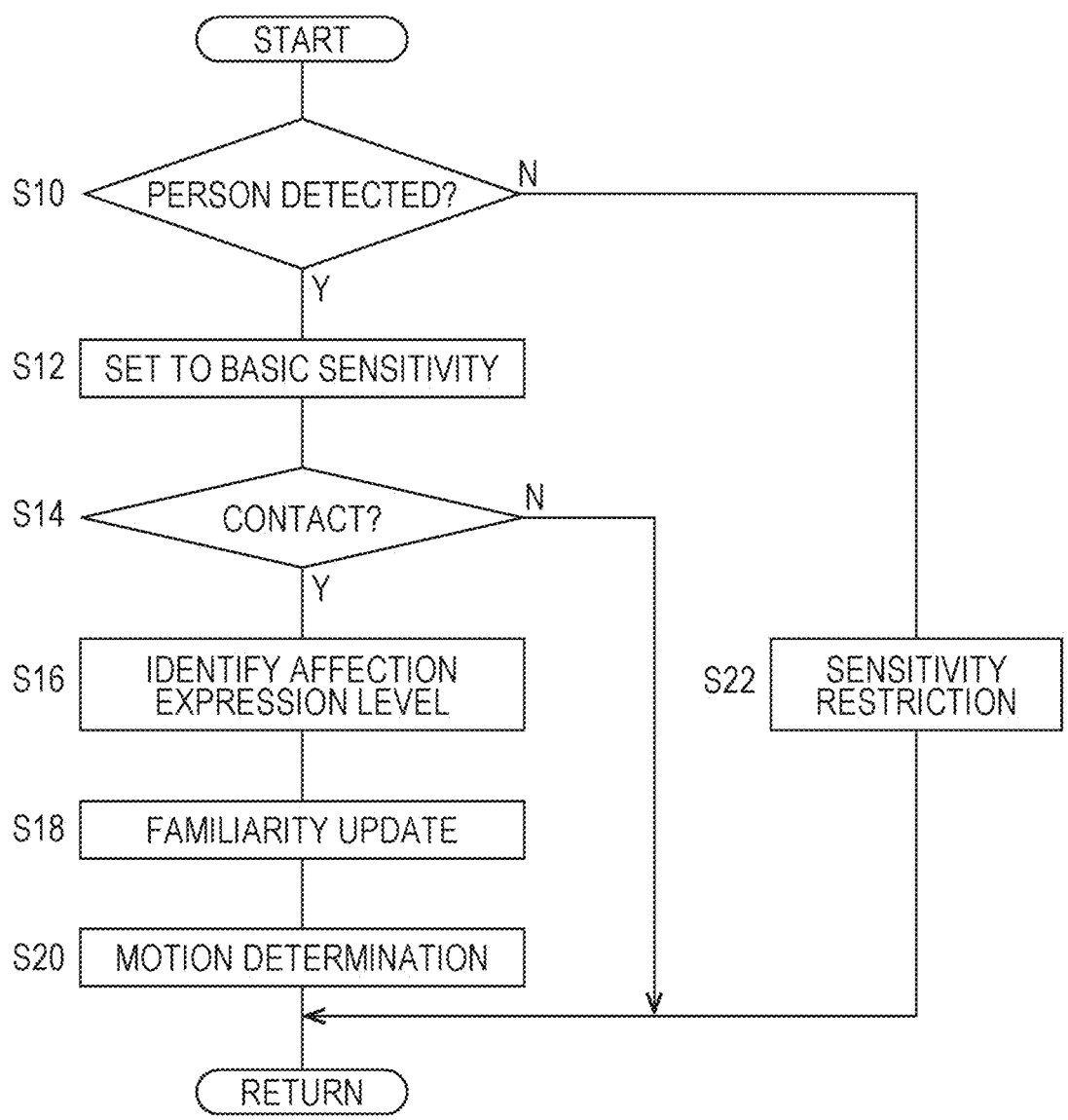
FIG. 9 is a flowchart showing a process when a contact is detected.

FIG. 9 is a flowchart showing a process when a contact is detected.

When no person can be confirmed in the periphery of the robot 100 (N of S10), or in other words, when no person can be filmed by the camera 402 and when no moving heat source can be detected by the thermosensor 404, the sensitivity control unit 174 restricts the sensitivity of the touch sensor 400 (S22). Restriction of sensitivity is realized by a drop in detection voltage. As contact detection by the touch sensor 400 is unneeded when nobody is present, restricting the sensitivity of the touch sensor 400 contributes to saving power. Restricting sensitivity at this point may mean turning off (deactivating) the touch sensor 400.

When a person is detected (Y of S10), the sensitivity control unit 174 sets the sensitivity of the touch sensor 400 to a normal sensitivity (hereafter called a "basic sensitivity") (S12). When no contact with the touch sensor 400 is detected (N of S14), a subsequent process is skipped.

When a contact is detected (Y of S14), the recognizing unit 156 identifies a contact aspect (contact place, contact strength, and contact time), and the emotion estimating unit 250 identifies an affection expression level (S16). The response recognizing unit 228 determines whether a responsive action is pleasant or unpleasant, and the familiarity managing unit 220 updates familiarity in accordance with a determination result (S18). Also, the operation control unit 222 selects one from among a multiple of motions in response to the contact action (S20). For example, when a cheek is touched, the operation control unit 222 may execute a motion of sitting on the spot and raising the arm 106.

It is supposed that when the robot 100 is wearing the clothing 180, the detection sensitivity of the touch sensor 400 decreases because of the clothing 180. When the clothing detecting unit 172 detects a wearing of the clothing 180, the sensitivity control unit 174 may increase the sensitivity of the touch sensor 400 to or above the basic sensitivity. The sensitivity of the touch sensor 400 may be adjusted in accordance with a kind or number of layers of the clothing 180. The server 200 or the robot 100 may have a data table in which clothing ID and a preferred sensitivity of the touch sensor 400 are correlated in advance.

Heretofore, the robot 100, and the robot system 300 including the robot 100, have been described based on an embodiment.

Action selection that cannot be patterned using one or more action maps, is difficult to predict, and is animal-like, is expressed.

An action of touching is a most primitive and basic means of communication. In the robot 100, the main body frame 310 corresponds to bone, the outer skin 314 to flesh, and the covering skin 406 to skin, and the touch sensor 400 corresponds to a nerve. As shown in FIG. 1, the touch sensor 400 covers a wide region of the body 104 of the robot 100. Because of this, the robot 100 can detect contact on various places. Also, contact strength can also be recognized by two layers, those being the first layer touch sensor 400a and the second layer touch sensor 400b, being adopted. As the touch sensor 400 is formed with a plastic film as a base, the touch sensor 400 can be affixed along the curved body 104.

The robot 100 is rounded and soft, and has an appropriate weight. Also, the robot 100 incorporates a heat source such as the battery 118, because of which warmth is transmitted to the body 104 of the robot 100. As a result of this, a user feels a desire to touch or hug the robot 100. By the touch sensor 400 being installed along the rounded and soft body 104, the robot 100 can recognize a large variety of contact actions.

When making contact gently, familiarity rises, in accordance with which the behavioral characteristics of the robot 100 also change. Meanwhile, when making contact roughly, familiarity decreases. An affection expression level (an estimated value of the strength of a companion's affection) is identified in accordance with the way of making contact, and the robot 100 selects various motions in accordance with the affection expression level. Not only does the robot 100 have the body 104 that a user feels a desire to touch, but also there is an arrangement such that empathy increases by touching, because of which interchange between a user and the robot 100 is easily promoted further.

The invention not being limited to the heretofore described embodiment or a modified example, components can be changed or embodied without departing from the scope of the invention. Various inventions may be formed by a multiple of the components disclosed in the heretofore described embodiment or the modified example being combined as appropriate. Also, some components may be eliminated from the total of components shown in the heretofore described embodiment or the modified example.

Although a description has been given assuming that the robot system 300 is configured of one robot 100, one server 200, and the multiple of external sensors 114, one portion of the functions of the robot 100 may be realized by the server 200, and one portion or all of the functions of the server 200 may be allocated to the robot 100. One server 200 may control a multiple of the robot 100, or a multiple of the server 200 may control one or more of the robot 100 in cooperation.

A third device other than the robot 100 and the server 200 may manage one portion of functions. A collection of the functions of the robot 100 and the functions of the server 200 described in FIG. 7 can also be comprehensively grasped as one "robot". It is sufficient that a method of distributing the multiple of functions needed in order to realize the invention with respect to one or multiple items of hardware is determined with consideration to the processing capability of each item of hardware, specifications required of the robot system 300, and the like.

As heretofore described, "the robot in a narrow sense" is the robot 100 excluding the server 200, but "the robot in a wide sense" is the robot system 300. It is thought that there is a possibility of many functions of the server 200 being integrated in the robot 100 in future.

In this embodiment, the first layer touch sensor 400a and the second layer touch sensor 400b are both hidden from the exterior by the covering skin 406 and the like. Because of this, a user is not aware of the existence of the touch sensor 400. The first layer touch sensor 400a may be installed on the covering skin 406. In this case, the first layer touch sensor 400a is visible from the exterior, but there is an advantage in that detection sensitivity increases.

There may be three or more layers of the touch sensor 400, and there may be one layer. In the case of one layer, this may be the second layer touch sensor 400b only, or may be the first layer touch sensor 400a only. Also, the touch sensor 400 may be installed as an intermediate layer of the outer skin 314.

In addition to an electrostatic capacitance sensor as a sensor for detecting contact, a method such that the covering skin 406 is formed of apiezoelectric fabric is also conceivable. By a polylactic acid fiber being used as a piezoelectric body fabric and a carbon fiber being used as an electrode, the piezoelectric fabric detects a charge generated by the polylactic acid fiber. In addition to this, a large variety of contacts may be detected by combining a thermocouple, a pressure sensor, a strain gauge, and the like.

The sensitivity of the touch sensor 400, which is an electrostatic capacitance sensor or the like, may be caused to differ in accordance with an installation place. For example, the sensitivity of the touch sensor 400 installed in the abdomen may be low, and the sensitivity of the touch sensor 400 installed in the buttocks or the arm may be set to be high. Sensitivity may be adjusted in accordance with a magnitude of detection voltage, or sensitivity may be changed by causing a density of the electrode wires in the electrostatic capacitance sensor to differ. By changing sensitivity in accordance with place, a skin sense peculiar to the robot 100, for example, the abdomen being insensitive and the buttocks being sensitive, can be realized. Also, reducing the sensitivity of the touch sensor 400 in one portion of places, rather than the whole of the touch sensor 400 being of a high sensitivity, also contributes to saving power.

A frequency of touching the robot 100 may affect the behavioral characteristics of the robot 100. For example, the robot 100 whose buttocks are often touched in a predetermined period after manufacture may recognize the buttocks being touched as a pleasant action or an expression of affection even after the predetermined period elapses. Meanwhile, the robot 100 whose buttocks are infrequently touched in the predetermined period may recognize the buttocks being touched as an unpleasant action or an insult (an action with a low affection expression level) after the predetermined period elapses. In this way, a method of determining "pleasant or unpleasant" may be changed in accordance with a contact aspect. That is to say, the robot 100 whose "upbringing" changes in accordance with a contact aspect in infancy can be realized.

In addition to contact place, contact strength, and contact time, pleasantness may be determined in accordance with contact frequency or a time band in which contact is performed. For example, although a cheek being touched is a pleasant action, this may change partway through to being recognized as an unpleasant action when the cheek is touched with a high frequency. Also, being touched during charging may be recognized as an unpleasant action.

Pleasantness in this embodiment has two values, those being "pleasant" and "unpleasant", but there may be three or more values. For example, pleasantness may be categorized into five steps, those being "extremely pleasant", "fairly pleasant", "average", "fairly unpleasant", and "extremely unpleasant". Pleasantness may be indicated as a continuous value. For example, when the abdomen is 2 points, touching strongly is −4 points, and a contact time of 3 seconds or more is 1.5 times, pleasantness in a case in which the abdomen is touched strongly for 3 seconds or more may be calculated to be −3 points, as (2−4)×1.5=−3. The familiarity managing unit 220 updates familiarity in accordance with pleasantness. Also, a motion corresponding to when pleasantness reaches a predetermined value or greater, or a predetermined value or less, may be correlated in advance.

Lifting in the Arms Motion

Figure 10:
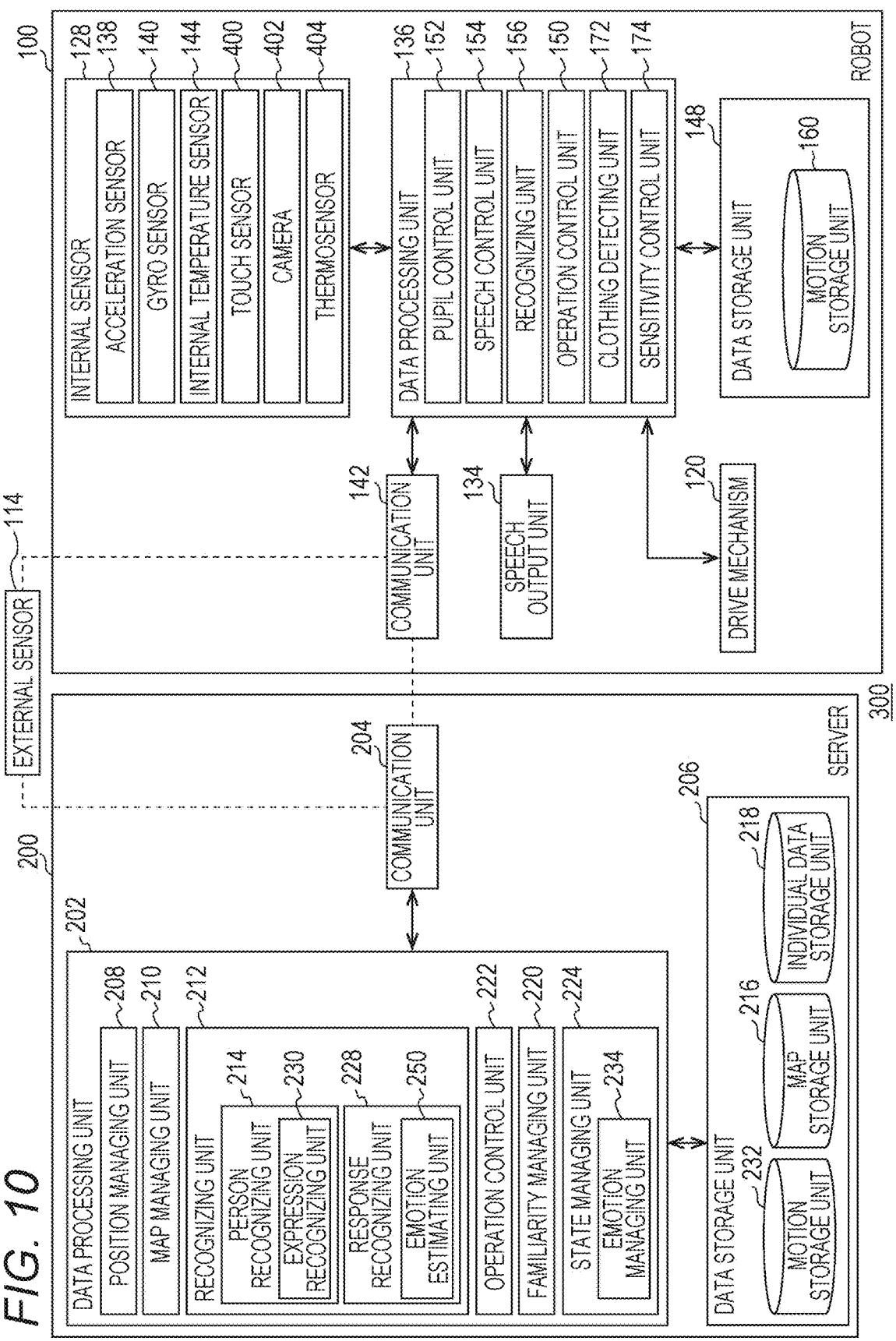
FIG. 10 is a functional block diagram of the robot system in a first working example.

FIG. 10 is a functional block diagram of the robot system 300 in a first working example.

In the robot system 300 of the first working example, the data processing unit 202 of the server 200 includes a state managing unit 224 in addition to the position managing unit 208, the map managing unit 210, the recognizing unit 212, the operation control unit 222, and the familiarity managing unit 220. The state managing unit 224 manages various kinds of internal parameter indicating various kinds of physical state, such as a charging rate, an internal temperature, and a processing load of the processor 122. The state managing unit 224 includes an emotion managing unit 234.

The emotion managing unit 234 manages various emotion parameters indicating an emotion (loneliness, curiosity, a desire for recognition, and the like) of the robot 100. These emotion parameters are constantly fluctuating. The importance of a multiple of action maps changes in accordance with an emotion parameter, a movement target point of the robot 100 changes in accordance with the action maps, and the emotion parameter changes in accordance with movement of the robot 100 and the passing of time.

For example, when an emotion parameter indicating loneliness is high, the emotion managing unit 234 sets a weighting coefficient of an action map that evaluates a place in which the robot 100 feels at ease to be high. When the robot 100 reaches a point on the action map at which loneliness can be eradicated, the emotion managing unit 234 reduces the emotion parameter indicating loneliness. Also, the various kinds of emotion parameter also change in accordance with a responsive action. For example, the emotion parameter indicating loneliness decreases when the robot 100 is "hugged" by an owner, and the emotion parameter indicating loneliness increases gradually when the robot 100 does not visually recognize an owner for a long time.

The robot 100 includes a speech output unit 134. The speech output unit 134 outputs speech. The robot 100 in this embodiment can output wordless speech like an animal's cry, such as a yawn, a shriek, or a purr, using the speech output unit 134.

The internal sensor 128 of the robot 100 includes an acceleration sensor 138, a gyro sensor 140, and an internal temperature sensor 144, in addition to the touch sensor 400, the camera 402, and the thermosensor 404. The recognizing unit 156 recognizes a lifting in the arms, a putting down while holding, and a falling of the robot 100, using the acceleration sensor 138. The recognizing unit 156 determines a posture of the robot 100 using the gyro sensor 140. The internal temperature sensor 144 detects the internal temperature of the robot 100.

The data processing unit 136 of the robot 100 includes a pupil control unit 152 and a speech control unit 154 in addition to the recognizing unit 156, the operation control unit 150, the clothing detecting unit 172, and the sensitivity control unit 174. The speech control unit 154 selects speech to be output from the speech output unit 134 from a multiple of speech patterns. The pupil control unit 152 generates an eye image (to be described hereafter), and causes the eye image to be displayed on the eye 110.

In the first working example, the operation control unit 150 of the robot 100 selects a motion in accordance with a kind (to be described hereafter) of lifting in the arms (hugging). An activation condition that forms a trigger for motion execution and a state condition that indicates a situation when the activation condition is satisfied are defined in advance, and various kinds of motion are executed as responsive behavior selected based on the activation condition and the state condition. The activation condition may be, for example, an event such as being stroked or spoken to by an owner, or may be an internal phenomenon such as when a value of the emotion parameter indicating loneliness exceeds a threshold. In the first working example, various kinds of activation condition are satisfied by being hugged, and by the kind of hug. It is sufficient that the state condition is a condition indicating an internal or external situation when the activation condition is satisfied, such as being watched closely by an owner, a multiple of users being in the periphery, or a room temperature being a predetermined temperature or higher.

The operation control unit 150 may identify one motion based on an activation condition and a state condition, or may select one motion from a multiple of motions based on a selection probability. For example, it is assumed that 10%, 20%, and 15% are set as selection probabilities of motions M1 to M3 respectively for an activation condition E1 and a state condition S1. In this case, the motions M1 to M3 are selection candidates when the activation condition E1 and the state condition S1 are satisfied, but a 55% probability of nothing being executed also exists.

Figure 11:
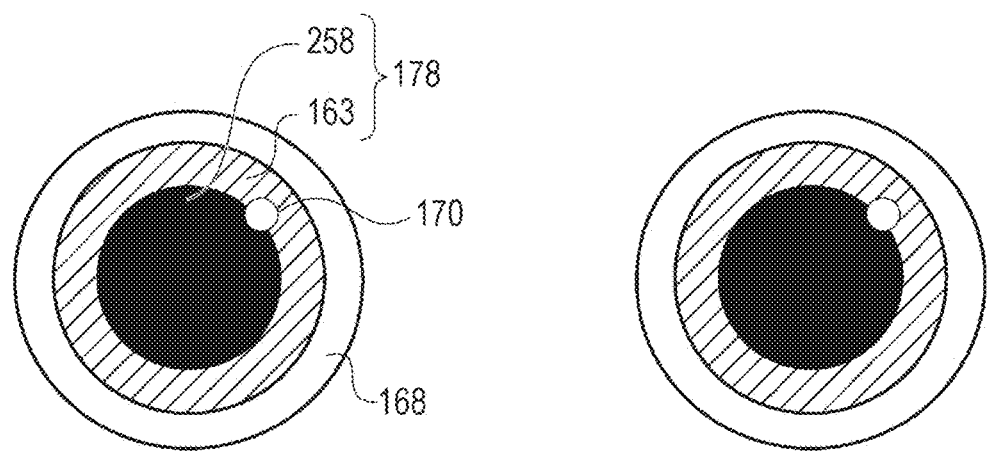
FIG. 11 is an external view of an eye image.

FIG. 11 is an external view of the eye image 176.

The eye 110 of the robot 100 is formed as a display on which the eye image 176 is displayed. The pupil control unit 152 generates the eye image 176 to include a pupil image 178 and a periphery image 168. The pupil control unit 152 also displays the eye image 176 as a moving image. Specifically, the pupil control unit 152 represents a line of sight of the robot 100 by moving the pupil image 178. Also, a blinking operation is executed at a predetermined timing. The pupil control unit 152 represents a large variety of movements of the eye image 176 in accordance with various operation patterns. A monitor of the eye 110 desirably has a curved form, in the same way as a human eyeball.

The pupil image 178 includes a pupillary region 258 and a corneal region 163. Also, a catch light 170 for expressing a reflection of external light is also displayed in the pupil image 178. Rather than shining owing to a reflection of external light, the catch light 170 of the eye image 176 is an image region expressed as a high-luminance region by the pupil control unit 152.

The pupil control unit 152 can move the pupil image 178 vertically and horizontally on the monitor. When the recognizing unit 156 of the robot 100 recognizes a moving object, the pupil control unit 152 expresses a "gaze" of the robot 100 by orienting the pupil image 178 toward the moving object.

The pupil control unit 152 not only moves the pupil image 178 relative to the periphery image 168, but can also represent a half-closed eye or a closed eye by causing an eyelid image to be displayed. The pupil control unit 152 may represent an aspect of the robot 100 sleeping using a closed eye display, or may represent an aspect of the robot 100 being in a half-asleep state, that is, a state of nodding off to sleep, by covering three-quarters of the eye image 176 with the eyelid image, then shaking the eyelid image.

Figure 12:
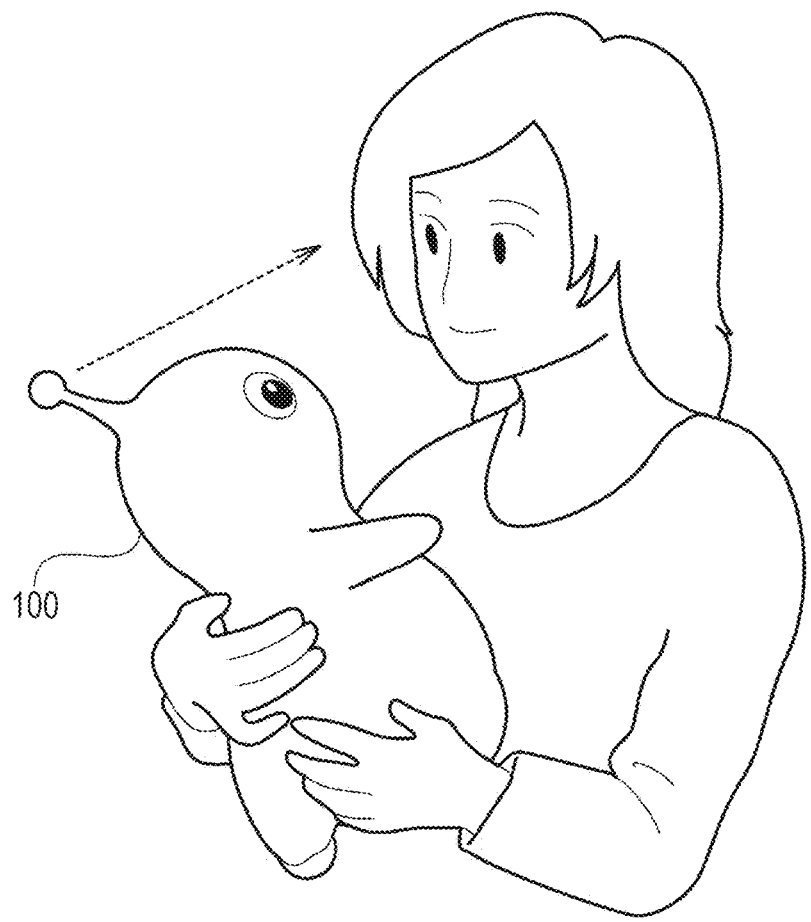
FIG. 12 is a first conceptual view of when hugging the robot.

FIG. 12 is a first conceptual view of when hugging the robot 100.

The robot 100 has the body 104, which is rounded, soft, and pleasant to touch, and an appropriate weight, and recognizes a touch as a pleasant action, because of which a user is easily caused to feel an emotion of wanting to hug the robot 100.

In FIG. 12, the robot 100 and an owner are facing each other. Also, the robot 100 is being hugged in a vertical direction. Hereafter, this kind of hug will be called a "confronting vertical hug". Also, the robot 100 being tilted sideways and hugged will be called a "horizontal hug". The recognizing unit 156 distinguishes an orientation (posture) of a hug using the gyro sensor 140. The recognizing unit 156 may distinguish a posture from an orientation of an image filmed by the camera 402, or may distinguish a posture based on contact aspects in each region of the robot 100 surface detected by the touch sensor 400. Of course, a posture of the robot 100 may be distinguished by combining results of detections by these detection means.

Figure 13:
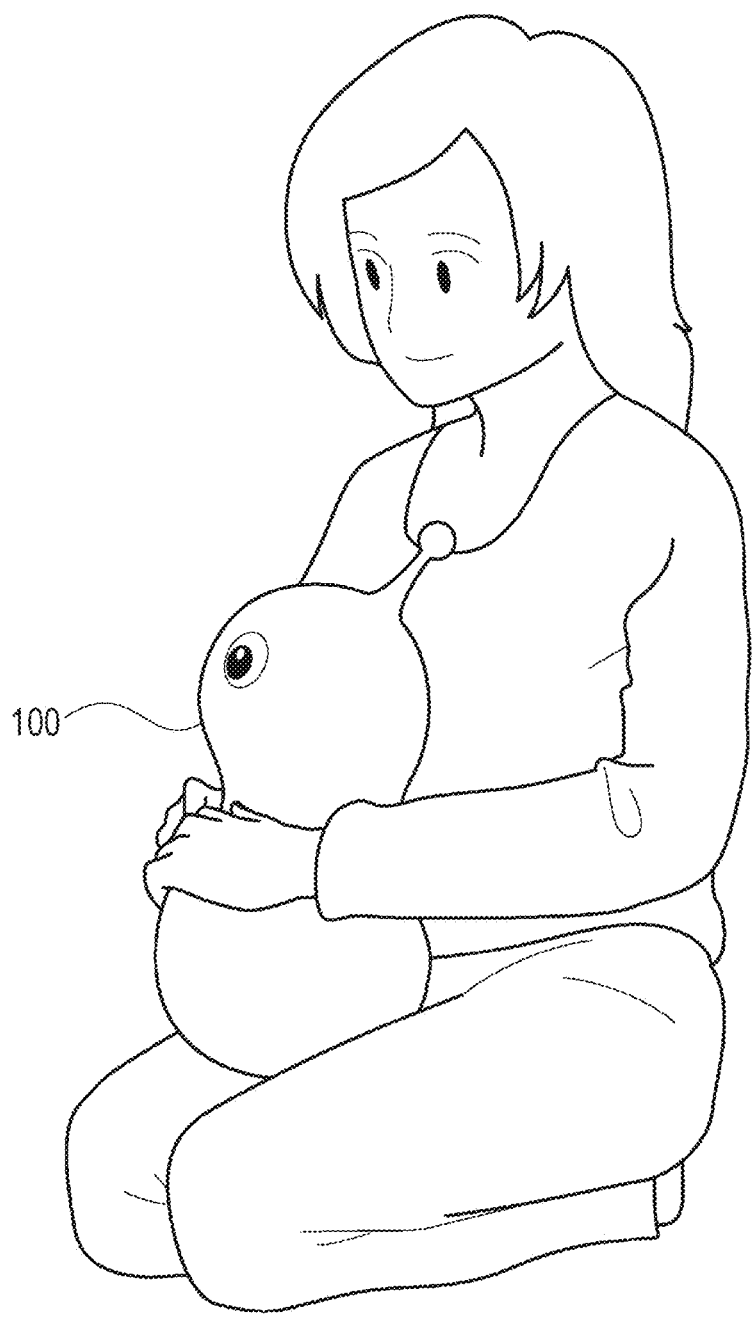
FIG. 13 is a second conceptual view of when hugging the robot.

FIG. 13 is a second conceptual view of when hugging the robot 100.

In FIG. 13, an owner is hugging the robot 100 from behind. The robot 100 is being hugged in a vertical direction. Hereafter, this kind of hug will be called a "rear vertical hug". The recognizing unit 156 distinguishes a kind of hug using a neural network, with various kinds of detection information from the gyro sensor 140, the camera 402, the thermosensor 404, and the touch sensor 400 as input information. For example, the recognizing unit 156 distinguishes between a vertical hug and a horizontal hug using the gyro sensor 140, and can distinguish that a hug is not a rear vertical hug when a face, a chest portion, or the like of an owner appears in close range in front of the robot 100. In addition to this, categories of various hugs, such as a hug such that the robot 100 is lifted onto a shoulder and hugged, or a hug such that an owner who is lying down places the robot 100 on an abdominal portion and hugs the robot 100 tightly, may be defined. Also, horizontal hugs may be defined divided into a "right-facing horizontal hug" and a "left-facing horizontal hug" in accordance with whether the head portion of the robot 100 is positioned on a right-arm side or a left-arm side of an owner. Furthermore, an "upward-facing horizontal hug" and a "downward-facing horizontal hug" may be defined depending on whether the abdomen portion of the robot 100 is facing upward (a ceiling side) or facing downward (a floor side).

Hereafter, a description will be given with the heretofore described confronting vertical hug, horizontal hug, and rear vertical hug as subjects.

Figure 14:
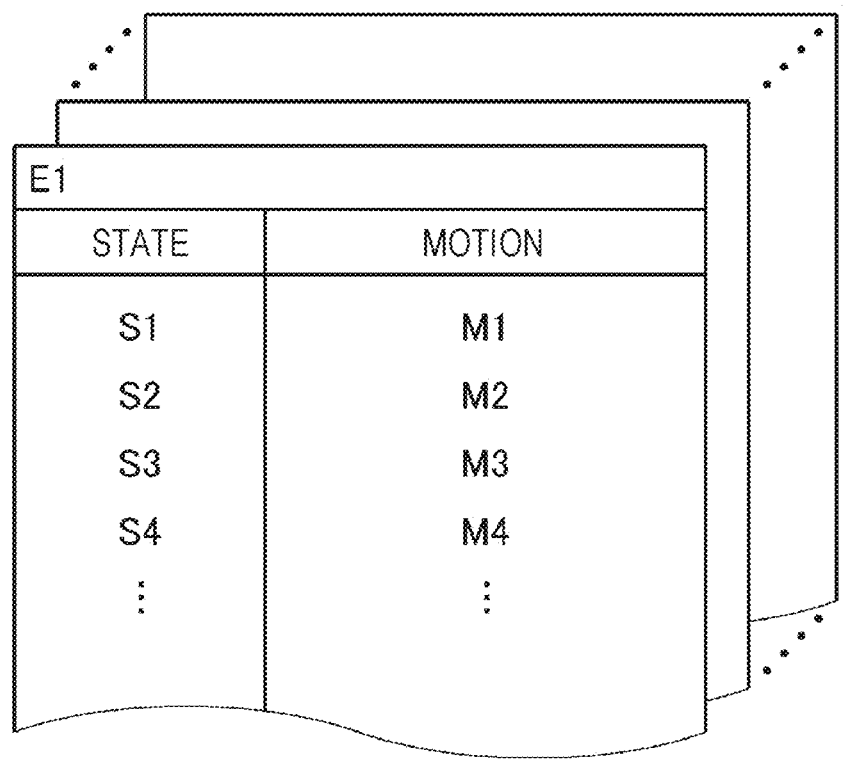
FIG. 14 is a data structure diagram of a motion selection table.

FIG. 14 is a data structure diagram of a motion selection table 190.

The motion selection table 190 is stored in the motion storage unit 232 of the server 200 or the motion storage unit 160 of the robot 100. An activation condition, a state condition, and a motion are correlated in the motion selection table 190. The motion selection table 190 of FIG. 14 shows motions selected in accordance with various kinds of state condition when the activation condition E1 is satisfied. The condition E1 is satisfied, for example, when the robot 100 is laterally hugged. An activation condition is prepared for each kind of hug, such as the confronting vertical hug and the rear vertical hug. Herein, the operation control unit 150 of the robot 100 selects the multiple of motions M1 to M3 expressing pleasure (hereafter, a motion expressing pleasure will be called a "motion of delight"), or a motion M4 expressing sleep, in accordance with state conditions S1 to S4.

The state condition S1 indicates a state wherein the robot 100 is not being touched other than by contact from a hug, that is, a state of simply being hugged only. In this case, the touch sensor 400 is not detecting a touch that is a movement by an owner. The state condition S2 is such that the abdomen portion being stroked is defined, the state condition S3 is such that the head portion being stroked is defined, and the state condition S4 is such that the abdomen portion being repeatedly patted gently is defined.

The motion of delight M1 correlated to the state condition S1 is a unit motion of staring at an owner. The motion of delight M2 correlated to the state condition S2 is a compound motion including unit motions of directing the line of sight toward an owner who is hugging, moving the arm 106, and shaking the head to left and right while emitting a sound of delight. The motion of delight M3 correlated to the state condition S3 is a compound motion including unit motions of directing the line of sight toward an owner and shaking the head to left and right. A motion expressing sleep is correlated to the state condition S4.

When the state condition S1 is satisfied when the activation condition E1 is satisfied, the operation control unit 150 selects the motion of delight M1. That is, the robot 100 moves each portion in accordance with the motion of delight M1 when hugged horizontally. The operation control unit 150 may always select the motion of delight M1 when the state condition S1 is satisfied, or may select the motion of delight M1 at a predetermined selection probability (less than 100%). Also, as heretofore described, the operation control unit 150 may select a motion of delight from the multiple kinds of motion of delight when the state condition S1 is satisfied. By the operation control unit 150 selecting a motion on a probability basis, the same motion always being executed when a certain condition is satisfied is prevented, and animal-like behavior can be realized.

In this way, the operation control unit 150 selects a motion in accordance with a kind of hug, particularly a posture when being hugged, and in accordance with which region of the body surface is being touched with which kind of contact aspect in that posture. Not only the operation control unit 150, but also the pupil control unit 152 causes the eye image 176 to change as one portion of a motion, and the speech control unit 154 outputs various items of speech as one portion of a motion.

Other than a hug, various phenomena are conceivable as a phenomenon forming a trigger for executing a motion, that is, an activation condition. For example, the operation control unit 150 may cause a motion to change in accordance with a contact aspect of where the robot 100 is touched by a user, and how strongly the robot 100 is touched. Other than this, the operation control unit 150 may select a motion with various phenomena, such as the upper back being stroked or a chin being stroked, as an activation condition. Also, an activation condition may be defined based on an emotion parameter such as pleasure (delight), loneliness, fear, or a desire for attention. A state condition may be such that a posture of the robot 100 and a contact aspect are correlated.

The pupil control unit 152 may express "agitation" by moving the eye image 176 little by little to left or right, and may express "interest" or "surprise" by enlarging the pupillary image 178. The operation control unit 150 may express a "physical fussiness" by causing an actuator to stop in a predetermined position, or conversely, may express "lethargy" by stopping a supply of power to an actuator. The operation control unit 150 may express "feeling good by being touched" or "ticklishness" by moving an actuator near a place touched by an owner little by little.

The speech control unit 154 may express a "pleasant feeling" by emitting a voice indicating pleasure when the abdomen is lightly hit or stroked in a confronting vertical hug state. At this time, the familiarity managing unit 220 raises familiarity with respect to the owner, and the emotion managing unit 234 lowers the emotion parameter indicating loneliness, whereby there is a change to a psychological state of "feeling at ease". When stroking under the chin of the robot 100 when the robot 100 is being hugged, various kinds of motion of delight such that the robot 100 also expresses pleasure, just as a dog or a cat expresses pleasure, may be selected. At this time, the pupil control unit 152 may express a "pleasant feeling" by changing the eyelid image of the eye image 176 to represent a half-closed eye.

When a predetermined time (hereafter called an "introduction time") elapses from hugging the robot 100, the robot 100 may express a behavioral aspect of falling asleep (hereafter called a "sleeping expression"). More specifically, when an owner hugs the robot 100, the speech control unit 154 outputs a "yawn", after which the operation control unit 150 causes the robot 100 to gradually become lethargic by reducing the supply of power to each actuator. Subsequently, the pupil control unit 152 causes the eye image 176 to close. At this time, the speech control unit 154 may regularly output sleeping noises at a low volume. When a further predetermined time elapses after starting the sleeping expression, the operation control unit 150 may save power by changing the processor 122 to a suspended state.

When a predetermined time (hereafter called a "sleeping time") elapses from the start of the sleeping expression or the shift to the suspended state, the operation control unit 150 causes the sleeping expression to end. At this time, the pupil control unit 152 causes the eye image 176 to open. When a predetermined awakening event occurs, such as when the touch sensor 400 detects a strong touch or when loud speech is picked up by the microphone, the operation control unit 150 or the like may cause the sleeping expression to end, despite being before the sleeping time elapses. When the sleeping expression is ended, the processor 122 returns from the suspended state to a normal operating state.

The introduction time may be changed in accordance with various kinds of parameter shown below. When an owner lifting and hugging the robot 100 sings a lullaby to the robot 100, or when the owner utters specific words such as "good night" or "beddy bye", the operation control unit 150 may shorten the introduction time. When the robot 100 is hugged by an owner with familiarity of a predetermined value or greater, the operation control unit 150 may shorten the introduction time. Alternatively, a setting may be such that the higher the familiarity, the shorter the introduction time becomes. According to this kind of control method, a feeling of ease at being hugged by an owner with high familiarity can be expressed by behavior. When the robot 100 is hugged by an owner with familiarity of a predetermined value or lower, the operation control unit 150 need not execute the sleeping expression of the robot 100.

The operation control unit 150 may set the introduction time to be shorter the greater an amount of activity before a hug, for example, the magnitude of a supply of power to each actuator in a latest predetermined period until being hugged, an amount of movement of the robot 100, an amount of power consumed, and the like. According to this kind of control method, a behavioral expression of being liable to become sleepy when moving energetically can be performed. In addition to this, the operation control unit 150 may set the introduction time to be shorter than normal when the value of the emotion parameter indicating loneliness decreases and the mentality of the robot 100 is in a state of "feeling at ease", when peripheral environmental noise is at a predetermined level or lower, when the room temperature is in a predetermined comfortable temperature range, for example, 15° C. to 25° C., or when the periphery is dark. In the same way, the operation control unit 150 may set extra sleeping time for the robot 100 when the robot 100 is in a state of feeling at ease, when it is quiet and the room temperature is appropriate, or when the amount of activity is large. The robot 100 holds the time and date of shifting from the suspended state to the normal state, and may refuse to sleep when a predetermined time has not elapsed from the previous sleeping state.

The sleeping expression is such that the robot 100 expresses animal-like behavior, and a formation of attachment to an owner is realized. Meanwhile, the sleeping expression is also an expression of a function of suspending the robot 100, and forms a trigger, that is, a start command of a function of suspending contact action by the owner with respect to the robot 100. In general, a suspending function is started by a user performing a direct operation such as a pressing a switch. The robot 100 in this embodiment is such that a "hugging" action of an owner continuing for a certain period forms a trigger of the suspending function. The hugging action is the same action as when putting a baby to bed, and can be carried out naturally by an owner. Because of this, when wanting the robot 100 to be quiet, an owner can put the robot 100 to bed, that is, suspend the robot 100, by hugging the robot 100 and crooning specific words such as "beddy bye", as when putting a baby to bed.

The internal temperature sensor 144 regularly measures the internal temperature of the robot 100. When the robot 100 is being hugged, the operation control unit 150 may delay starting the sleeping expression until the internal temperature drops to or below a predetermined temperature.

When an owner moves a finger left and right in front of the eye 110 of the robot 100, the pupil control unit 152 may cause the pupillary image 178 to move left and right following the finger. Further, the operation control unit 150 may cause the eye image 176 to shift to the sleeping state after the left-right reciprocating operation of the pupillary image 178 has continued a few times. For example, an activating condition is defined as an owner holding up a finger in front of the eye 110 after the owner utters the specific words "watch this". A state condition is defined as moving the finger left and right three times. When the activation condition and the state condition are satisfied, a motion of shifting to the sleeping state is executed. A movement, that is, a gesture by an owner forms a trigger that causes the robot 100 to select a motion. At this time, a management program executed in the processor 122 may shut down the functions of the robot 100. According to this kind of control method, the robot 100 can easily be caused to stop by a gesture, without using a device such as a button.

Not being limited to a motion of delight expressing pleasure, the operation control unit 150 can execute various motions. For example, when an activation condition E2 is satisfied, the operation control unit 150 may execute a motion expressing fear. For example, the robot 100 being lifted to a position higher than an owner's face, the robot 100 falling from a high place, being subjected to violence, detecting a noise of a predetermined volume or greater, and the like, are conceivable as the activation condition E2. The recognizing unit 156 recognizes a rise and a drop using the acceleration sensor 138. Also, the recognizing unit 156 determines whether or not the robot 100 has been lifted above an owner's face using the camera 402. The recognizing unit 156 recognizes a violent action such as kicking or hitting using the touch sensor 400.

"Freezing", whereby an actuator is fixed and maintained in a predetermined position, outputting a shrieking sound, "fainting, whereby the eye is closed after turning off an actuator, "agitation", whereby the pupillary image 178 is shaken left and right, and the like, are conceivable as a motion expressing fear.

When the robot 100 is hugged, the operation control unit 150 may select a motion of attempting to escape from the hug (hereafter, a motion of refusing involvement with an owner will be called a "refusal motion"). A refusal motion may be defined as a combination of unit motions such as, for example, staring at the owner, emitting a voice, repeatedly moving the arm 106, shaking the head left and right, repeatedly moving the front wheel 102 in and out, shaking the trunk left and right, moving each portion so as to cause the owner to feel that hugging is difficult, and the like. When the robot 100 cannot escape from the hug even by executing a refusal motion, the robot 100 may execute the sleeping expression after the introduction time elapses. When the robot 100 is hit during a hug, the operation control unit 150 may select a refusal motion after selecting a motion indicating surprise, such as looking in the direction of the hit.

When the robot 100 is hugged, the operation control unit 150 may execute a refusal motion such that an amount by which each kind of actuator can move is large, and reduce the amount by which the actuators can move with the passing of time, thereby expressing by behavior "an aspect of gradually giving up and quietening down". Also, after the robot 100 quietens down, the pupil control unit 152 may express by behavior an aspect of "giving up on escaping" by shifting the line of sight of the pupillary image 178 from the user.

When movement of a user is not detected for a predetermined time or longer by the camera 402 or the touch sensor 400 in a state in which the robot 100 is hugged, the operation control unit 150 reduces the amount by which the actuators can move. Further, when this kind of state continues for a predetermined time, the operation control unit 150 may execute a refusal motion. A complex behavioral expression can be performed in that the robot 100 relaxes and entrusts the body when the owner does not move, but becomes bored of the hug and wants to move when the owner does not move for a long time.

When the robot 100 is touched when the front wheel 102 is out, the operation control unit 150 executes a motion of orienting the body 104 toward the user who has touched. Meanwhile, when the robot 100 is touched when the front wheel 102 is housed, the operation control unit 150 may execute a motion of orienting the head toward the user, without moving the body 104. In this way, the operation control unit 150 may select differing motions in accordance with the housing state of the front wheel 102 when the robot 100 is touched.

When a back face of the body 104, for example the buttocks, are touched, the operation control unit 150 may express an aspect of the robot 100 attempting to see the place that has been touched, but being confused by being unable to do so, by causing the body 104 to rotate. When the same place on the body 104 is touched continuously, the pupil control unit 152 may express by behavior a "gesture of being bothered about being touched" by directing the line of sight to the place touched. Furthermore, when continuing to be touched in the same place, the robot 100 may execute a predetermined motion such as bending the neck back, becoming lethargic, waving the arm 106, or emitting a yawn. In order to escape from the continuous touch, the operation control unit 150 may cause the robot 100 to move in a direction away from the user. When the head is touched, the operation control unit 150 may execute a motion of disliking the touch by causing the neck to move. When a touch continues, the pupil control unit 152 may express an ill-tempered expression such as a glare by directing the sensitivity control unit 174 toward the user.

The touch sensor 400 may be installed in an upper half of the horn 112. Further, when the upper half of the horn 112 is touched, the operation control unit 150 may select various refusal motions. For example, when the upper half of the horn 112 is touched for one second or longer or touched twice or more, the operation control unit 150 may express a characteristic of "hating to have the horn 112 touched" by escaping from the user. According to this kind of control method, the field of view being blocked by the horn 112, in which the camera 402 (an omnidirectional camera) is mounted, being gripped is easily prevented.

What is claimed is:
1. An autonomously acting robot, comprising:
 a sensor configured to detect a contact by a user at a contact location on a body surface of the robot;
 a non-transitory computer readable medium configured to store instructions; and a processor connected to the non-transitory computer readable medium, wherein the processor is configured to execute the instructions for:
identifying the detected contact as a contact type from a plurality of contact types based on a combination of the contact location and a contact strength of the detected contact;
determining an affection expression level based on the identified contact type;
updating a familiarity level associated with the user based on the identified contact type; and
controlling behavioral characteristics of the robot based on the determined affection expression level.

2. The autonomously acting robot according to claim 1, wherein the processor is further configured to execute the instructions for:
changing an emotion level of the robot in response to the determined affection expression level,
controlling the behavioral characteristics of the robot based on the emotion level.

3. The autonomously acting robot according to claim 1, further comprising:
an elastic outer skin on an external surface of the robot, wherein
the sensor is configured to detect the contact by the user at a contact location on the elastic outer skin.

4. The autonomously acting robot according to claim 3, wherein the sensor is shaped along a shape of the external surface of the robot.

5. The autonomously acting robot according to claim 3, wherein the sensor comprises
a first portion on an outer surface of the elastic outer skin, and
a second portion between the external surface of the robot and an inner surface of the elastic outer skin.

6. The autonomously acting robot according to claim 1, wherein the processor is further configured to execute the instructions for reducing a detection sensitivity of the sensor in response to a determination that no user is in a peripheral region surrounding the robot.

7. The autonomously acting robot according to claim 1, wherein the processor is further configured to execute the instructions for generating a notification operation in response to a second sensor for detecting external information being impeded during detecting of the contact by the user.

8. An autonomously acting robot, comprising:
a sensor configured to a contacted by a user;
a clothing detector configured to detect a wearing of clothing by the robot;
a non-transitory computer readable medium configured to store instructions; and
a processor connected to the non-transitory computer readable medium, wherein the processor is configured to execute the instructions for:
selecting a motion of the robot based on the detected contact;
controlling a detection sensitivity of the sensor based on a determination of whether the robot is wearing clothing; and
a drive mechanism configured to execute the selected motion.

9. The autonomously acting robot according to claim 8, wherein the processor is further configured to execute the instructions for:
identifying the detected contact as a contact type from a plurality of contact types based on a combination of the contact location and a contact strength of the detected contact;
determining an affection expression level based on the identified contact type; and
controlling behavioral characteristics of the robot based on the determined affection expression level.

10. The autonomously acting robot according to claim 8, wherein the processor is further configured to execute the instructions for:
changing an emotion level of the robot in response to the determined affection expression level,
controlling the behavioral characteristics of the robot based on the emotion level.

11. The autonomously acting robot according to claim 8, further comprising:
an elastic outer skin on an external surface of the robot, wherein
the sensor comprises a first portion in the elastic outer skin.

12. The autonomously acting robot according to claim 11, wherein the first portion of the sensor comprises a curved sensor.

13. The autonomously acting robot according to claim 11, wherein the second comprises a second portion between the external surface of the robot and the elastic outer skin.

14. The autonomously acting robot according to claim 8, wherein the processor is further configured to execute the instructions for reducing a detection sensitivity of the sensor in response to a determination that no user is in a peripheral region surrounding the robot.

15. The autonomously acting robot according to claim 8, wherein the processor is further configured to execute the instructions for generating a notification operation in response to a second sensor for detecting external information being impeded during detecting of the contact by the user.

16. An autonomously acting robot, comprising:
a sensor configured to detect a contact by a user on a body surface of the robot at a contact location;
a non-transitory computer readable medium configured to store instructions; and
a processor connected to the non-transitory computer readable medium, wherein the processor is configured to execute the instructions for:
recognizing a lifting or hugging of the robot,
categorizing aspects of the lifting or hugging, into a plurality of contact types, based on the contact location and a strength of the contact,
identifying one contact type of the plurality of contact types based on the contact location and the strength of the contact after lifting or hugging of the robot;
selecting a motion of the robot based on the identified one contact type; and
a drive mechanism configured to execute the selected motion.

17. The autonomously acting robot according to claim 16, wherein the processor is further configured to execute the instructions for:
detecting a posture of the robot during the lifting or hugging of the robot, and
selecting the motion based on the detected posture of the robot.

18. The autonomously acting robot according to claim 16, wherein the processor is further configured to execute the instructions for causing a pupil image displayed on an eye of the robot to change based on a duration of the lifting or hugging of the robot.

19. The autonomously acting robot according to claim 17, wherein the processor is further configured to execute the instructions for causing the pupil image to close in response to the duration of the lifting or hugging continuing for a predetermined time.

20. The autonomously acting robot according to claim 16, further comprising:
   an elastic outer skin on an external surface of the robot, wherein
   the sensor comprises a first portion in the elastic outer skin.

* * * * *